United States Patent
Hino et al.

(10) Patent No.: US 6,965,545 B2
(45) Date of Patent: Nov. 15, 2005

(54) OPTICAL RECORDING MEDIUM WITH PREPIT REGIONS AND RECORDING/REPRODUCING METHOD THEREOF

(75) Inventors: Yasumori Hino, Ikoma (JP); Masayoshi Shioya, Itami (JP); Kazumasa Hirano, Tamana (JP); Shohei Yumita, Kasuga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 337 days.

(21) Appl. No.: 10/110,613

(22) PCT Filed: Aug. 16, 2001

(86) PCT No.: PCT/JP01/07069

§ 371 (c)(1),
(2), (4) Date: Aug. 26, 2002

(87) PCT Pub. No.: WO02/17309

PCT Pub. Date: Feb. 28, 2002

(65) Prior Publication Data

US 2003/0053343 A1    Mar. 20, 2003

(30) Foreign Application Priority Data

Aug. 18, 2000  (JP)  ............................. 2000-248486

(51) Int. Cl.$^7$ .......................................... G11B 11/00
(52) U.S. Cl. .................. 369/13.54; 369/275.4
(58) Field of Search .................... 369/13.54, 13.55, 369/275.4, 13.35, 275.3, 275.2, 277, 278; 360/59; 428/64.3, 64.1, 64.4; 430/270.13, 430/320, 321

(56) References Cited

U.S. PATENT DOCUMENTS

| | | | |
|---|---|---|---|
| 5,214,629 A | 5/1993 | Watanabe et al. | |
| 5,459,711 A | 10/1995 | Ohta et al. | |
| 5,914,920 A | 6/1999 | Yokogawa | |
| 6,027,825 A | 2/2000 | Shiratori et al. | |
| 6,122,229 A * | 9/2000 | Yonezawa | 369/13.08 |
| 6,608,799 B2 * | 8/2003 | Hozumi | 369/13.26 |

FOREIGN PATENT DOCUMENTS

| | | |
|---|---|---|
| EP | 0 829 854 | 3/1998 |
| JP | 4-301219 | 10/1992 |
| JP | 5-73929 | 3/1993 |
| JP | 6-290496 | 10/1994 |
| JP | 11-120636 | 4/1999 |
| WO | WO 98/54709 | 12/1998 |

* cited by examiner

*Primary Examiner*—Tan Dinh
(74) *Attorney, Agent, or Firm*—Hamre, Schumann, Mueller & Larson, P.C.

(57) ABSTRACT

An information recording medium for reproducing information by irradiation with a laser beam condensed by an objective lens with a numerical aperture NA includes a disk-shaped substrate and a recording layer disposed on the substrate. On the surface of the substrate, a plurality of prepit regions and a plurality of data regions are disposed alternately along spiral or concentric virtual track centers. Each prepit region includes a pair of wobble pits for tracking servo, and a length L ($\mu$m) of the wobble pit along the virtual track center, a wavelength $\lambda$ ($\mu$m) of the laser beam, and a numerical aperture NA satisfy a relationship: $0.3 \leq L \cdot NA/\lambda \leq 0.65$.

10 Claims, 20 Drawing Sheets

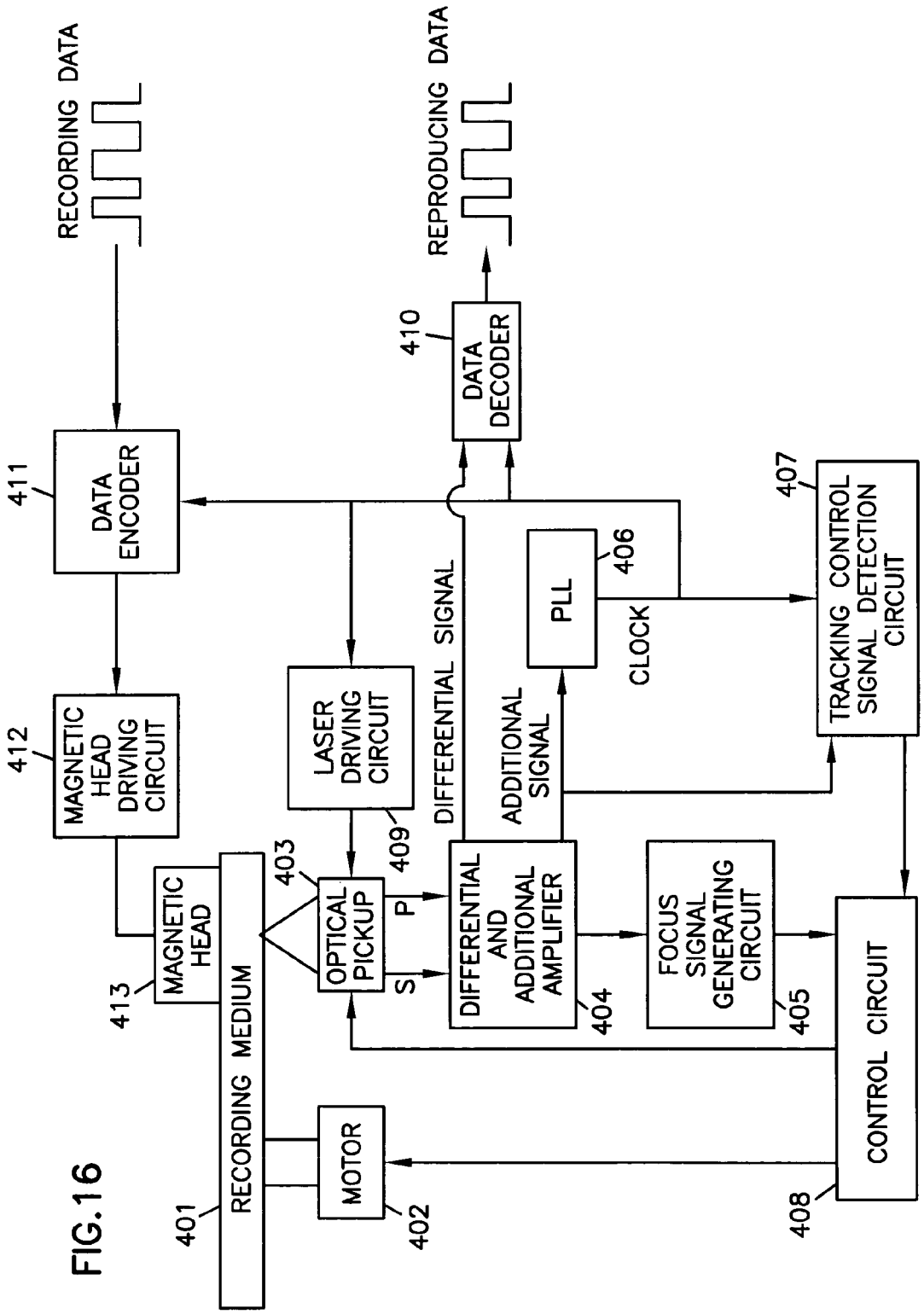

OPTICAL RECORDING MEDIUM WITH PREPIT REGIONS AND RECORDING/REPRODUCING METHOD THEREOF

TECHNICAL FIELD

The present invention relates to an information recording medium for reproducing information by irradiation with a laser beam, and a recording/reproducing method thereof

BACKGROUND ART

Recently, there is a demand for high-density optical disks, and the track pitch thereof is being narrowed while the linear density is being increased. In order to achieve a narrow track pitch, it is required to reduce interference with adjacent tracks such as cross-write. Therefore, it is important to conduct tracking control of a beam spot for recording/reproducing with good precision.

As a method for controlling a beam spot, a push-pull tracking system is frequently used. However, this system has problems involved in a shift of an optical axis and a tilt of a disk.

As a method for controlling a beam spot while reducing an error of tracking control even when fluctuations such as a shift of an optical axis occur, a sample servo tracking system is known. According to this system, tracking control is conducted based on a reproduction signal from prepit regions disposed separately on a disk. FIG. 17A schematically shows a conventional configuration of a prepit region on an optical disk adopting the sample servo tracking system.

Referring to FIG. 17A, in a prepit region, each clock pit 2 is disposed on a virtual track center 1. Furthermore, a pair of wobble pits 3 are disposed at positions shifted by a ¼ track from the virtual track center 1. A pair of wobble pits 3 are composed of a first wobble pit 3a and a second wobble pit 3b disposed on different sides of the virtual track center 1. An address pit 4 is formed at a predetermined distance from the second wobble pit 3b along the virtual track center 1.

According to the sample servo tracking system, a tracking error is detected based on the amount of reflected light (reproduction signal) from a pair of wobble pits 3. FIGS. 17B to 17D show reproduction signals in the prepit region shown in FIG. 17A. A section Tc represents a reproduction signal from the clock pit 2, a section Tw1 represents a reproduction signal from the first wobble pit 3a, and a section Tw2 represents a reproduction signal from the second wobble pit 3b.

The wobble pits 3a and 3b are shifted in opposite directions at the same distance from the virtual track center 1. Therefore, in the case where a beam spot for recording/reproducing passes along the virtual track center 1, a decreased amount V1 of the reflected light in the section Tw1 is equal to a decreased amount V2 of the reflected light in the section Tw2, as shown in FIG. 17B. In the case where a beam spot is shifted to the first wobble pit 3a side, the decreased amount V1 of the reflected light in the section Tw1 is increased, whereas the decreased amount V2 of the reflected light in the section Tw2 is decreased, as shown in FIG. 17C. On the other hand, in the case where a beam spot is shifted to the second wobble pit 3b side, the decreased amount V1 of the reflected light in the section Tw1 is decreased, whereas the decreased amount V2 of the reflected light in the section Tw2 is increased, as shown in FIG. 17D.

As described above, when a beam spot is shifted from the virtual track center 1, a difference is caused between the decreased amounts V1 and V2 of reflected light. According to the sample servo tracking system, by detecting the difference (tracking control signal) between the decreased amounts V1 and V2 of reflected light, tracking control is conducted. According to the sample servo tracking system, all the reflected light from a disk is used, so that tracking control is unlikely to be influenced by a shift of a lens, a tilt of a disk, and the like, which decreases a residual error in tracking control.

JP 4(1992)-301219 A discloses a method for increasing recording density in the above-mentioned sample servo tracking system. According to this method, wobble pits are shared by adjacent tracks. This method can double tracking density, compared with a conventional method.

Furthermore, in a conventional optical disk, the reproduction resolution of a signal is determined substantially by a wavelength λ of the reproduction light and a numerical aperture (NA) of an objective lens, and a pit period of a detection limit is essentially $\lambda/(2/NA)$. However, it is not easy to shorten a wavelength of reproduction light or increase a numerical aperture of an objective lens. Therefore, various attempts have been proposed for increasing recording density of information by modifying a recording medium and a reproduction method. For example, JP 6(1994)-290496 A discloses a technique of enhancing a reproduction resolution beyond a detection limit determined by a wavelength of reproduction light and a numerical aperture of an objective lens, using a DWDD method. According to the DWDD method, magnetic domain walls move successively by irradiation with a light beam for reproduction, and the movement of the magnetic domain walls is detected. According to this technique, when a reproduction layer that is a first magnetic layer, in which magnetic domain walls move upon being irradiated with a light beam for reproduction, is separated magnetically between respective information tracks, a particularly satisfactory reproduction signal is obtained.

As a method for magnetically cutting off a magnetic layer between information tracks, there is a method for conducting laser annealing between information tracks. However, it takes much time to conduct laser annealing. In order to solve this problem, a method for forming grooves and lands on an optical disk, and separating a magnetic domain wall moving layer by the lands is proposed (see JP 11(1999)-120636 A). Furthermore, in an optical disk using both grooves and lands as recording tracks, a method also is proposed for separating a magnetic domain wall moving layer by using a tilt of an inclined surface of the lands and grooves (see JP 11(1999)-120636 A).

However, in the case where information is recorded/reproduced with respect to a high-density optical disk in accordance with the conventional sample servo tracking system, sufficient tracking accuracy is not ensured. This makes it difficult to realize a high-density optical disk. The problem regarding tracking accuracy becomes particularly serious in the case of an optical disk conducting recording/reproducing in accordance with the DWDD method described in the prior art. This is because the DWDD method allows recording/reproducing to be conducted beyond the limit of a resolution of an optical beam. In a conventional optical disk that does not adopt the DWDD method, the optical resolution controls the recording density. Therefore, when a track pitch is narrowed, reproduction cannot be performed due to crosstalk from an adjacent track. In order to avoid this crosstalk, it is required to increase a track pitch to about 0.67 times of λ/NA. However, according to the DWDD method, recording/reproducing can be performed even when a track pitch is narrowed to about 0.49 times of λ/NA Therefore, tracking accuracy that is much higher than that of a conventional optical disk is required to go along with the enhancement of track density by narrowing a track pitch.

There are the following two problems for achieving such high tracking accuracy in the sample servo tracking system.

1. Due to a tilt of an optical disk, a tracking error occurs, decreasing the tracking accuracy.

2. An amplitude of a tracking control signal is varied between an inner periphery and an outer periphery of a disk, decreasing the tracking accuracy.

The first problem will be described. In tracking control in accordance with the push-pull tracking system used in a conventional optical disk, a DC offset occurs in a tracking control signal by a tilt of a disk and a shift of a lens, and this error decreases tracking accuracy. In contrast, according to the sample servo tracking system, a DC offset is not generated in a tracking control signal due to a tilt of a disk, a shift of a lens, and the like. Therefore, it has been considered in the prior art that the advantage of the sample servo tracking system lies in that a tracking control signal is not fluctuated due to a tilt of a disk, a shift of a lens, and the like. However, in the sample servo tracking system, a tracking error that does not occur in a DC offset of a tracking control signal occurs due to a tilt of a disk, which decreases the tracking accuracy. This phenomenon becomes conspicuous in an optical disk that shares wobble pits between adjacent tracks, as disclosed in JP 4(1992)-301219 A.

FIG. 18A shows a sample servo tracking system in the case where wobble pits are not shared between adjacent tracks, and FIG. 18B shows a sample servo tracking system in the case where wobble pits are shared between adjacent tracks. In an information recording medium in FIG. 18B, the virtual track center 1 includes virtual track centers 1a and 1b having different polarities of reproduction signals from wobble pits. Compared with FIG. 18A, it is understood in FIG. 18B that the wobble pits of adjacent tracks are close to a light beam 5 to cause large interference. Thus, when track density is increased, the interference of wobble pits between adjacent tracks is increased. As a result, a tracking error occurs in the case where a tilt of a disk occurs, which decreases the tracking accuracy. Similarly, the interference of pits before and after wobble pits also causes a tracking error.

As an example, FIG. 19 shows a reproduction signal in the case where an interval between the clock pit 2 and the first wobble pit 3a is insufficient. In this case, the decrease in the amount V1' of reflected light in the section Tw1 is increased due to the influence of the clock pit 2. Thus, even in the case where a beam spot scans the virtual track center 1, a tracking control signal (V1'-V2) does not become 0, and exact tracking control cannot be conducted.

Next, the second problem will be described in which an amplitude of a tracking control signal is varied between an inner periphery and an outer periphery of a disk, and the tracking accuracy is decreased.

FIGS. 20A to 20C show how a reproduction signal is changed due to the length of a prepit. In the case where a prepit is too short, an amplitude of a signal is too small to conduct tracking control, as shown in FIG. 20A As a prepit becomes longer, an amplitude of a signal is increased as shown in FIG. 20B. When a prepit becomes longer compared with the state shown in FIG. 20B, an amplitude is decreased slightly to form a flat portion, as shown in FIG. 20C.

When an amplitude of a reproduction signal from the wobble pits is changed depending upon the position on a disk, an amplitude of a tracking control signal is varied depending upon the position on a disk, which decreases the reliability of tracking control. In order to avoid this problem, a method is proposed for prescribing a wobble pit to be longer than a spot diameter to form a flat portion in a reproduction signal, and using a signal of this portion to obtain a stable tracking control signal (see JP 5(1993)-73929 A). However, if a wobble pit is made longer, the prepit region becomes longer, so that linear density is decreased.

Thus, in order to achieve high density in an optical disk adopting the sample servo tracking system, the size of a prepit in a prepit region and the interval between prepits are important.

In particular, according to the DWDD method, data is recorded onto a recording track cut off magnetically from an adjacent track, and a gradient of a heat distribution is used to conduct enlargement reproduction. Therefore, when tracking offset occurs during recording and reproduction, reproduction characteristics are degraded remarkably to cause an error. In order to conduct reproduction without an error, it is required to suppress a tracking error within ±0.04 µm. In an optical disk that is a medium to be replaced, it is very difficult. to suppress a tracking error (including those occurring due to convertibility and vibration between apparatuses) within ±0.04 µm.

The above-mentioned sample servo tracking system is excellent, in which a tracking error is unlikely to occur due to a tilt of a disk, a shift of a lens, and the like. However, it is very difficult to decrease a tracking error under various conditions even by using this system. In the sample servo tracking system, variations in an amplitude of a tracking control signal in a disk and a detection error of a tracking position occurring from a disk tilt become main factors of a tracking error. Furthermore, the margin of a tracking error needs to cover factors such as a control residual error involved in tracking control, a tracking error occurring due to vibrations, and a detection error at a tracking position.

In an ordinary optical disk, there are a control residual error of about ±0.015 µm and a tracking error of ±0.02 µm caused by vibrations. In the DWDD method in which a tracking error margin is very small, i.e., ±0.04 µm, a detection error of only about ±0.005 µm of a tracking position remains. Therefore, a detection error of a tracking control signal in the sample servo tracking system, which has not been a problem in the prior art, also becomes a serious problem. Since a track pitch of a high-density optical disk is about 0.5 to 0.6 µm, a detection error of ±0.005 µm becomes about 1% of a track pitch. Therefore, in order to realize a high-density optical disk, it is required to realize the above-mentioned tracking position detection error in the smallest possible servo region.

DISCLOSURE OF INVENTION

In view of the above, the object of the present invention is to provide an information recording medium in which tracking control can be conducted with reliability and recording density can be increased.

In order to achieve the above-mentioned object, a first information recording medium of the present invention, for reproducing information by irradiation with a laser beam condensed by an objective lens with a numerical aperture NA, includes a disk-shaped substrate and a recording layer disposed on the substrate, wherein, on a surface of the substrate, a plurality of prepit regions and a plurality of data regions are disposed alternately along spiral or concentric virtual track centers, each prepit region includes a pair of wobble pits for tracking servo, and a length L ($\mu$m) of the wobble pit along the virtual track center, a wavelength $\lambda$ ($\mu$m) of the laser beam, and the NA satisfy a relationship: $0.3 \leq L \cdot NA/\lambda \leq 0.65$. In the first information recording medium, irrespective of the position on the substrate, the amplitude of a reproduction signal from a wobble pit becomes constant. Therefore, the first information recording medium allows tracking control to be conducted with reliability, and high-density recording to be conducted. Furthermore, the magnitude of interference caused by wobble pits in adjacent tracks shown in FIG. 18B is proportional to the length of the wobble pits. Therefore, by shortening the wobble pits, the interference can be reduced, and the tracking accuracy can be enhanced substantially in the case where an optical disk is tilted in a radius direction. In the present specification, "one track" refers to a single revolution.

In the first information recording medium, it is preferable that flat portions are present on the surface of the substrate before and after the wobble pits along the virtual track center, and a length M ($\mu$m) of the flat portion along the virtual track center and the spot diameter D ($\mu$m) satisfy a relationship: $0.65 \leq (M/D)$. According to this configuration, even when a tangential tilt occurs, tracking control can be conducted with reliability. Therefore, for example, information can be reproduced by using the DWDD method that is likely to be influenced by a residual error of tracking control, and the linear density can be enhanced.

A second information recording medium of the present invention, for reproducing information by irradiation with a laser beam condensed by an objective lens with a numerical aperture NA, includes a disk-shaped substrate and a recording layer disposed on the substrate, wherein, on a surface of the substrate, a plurality of prepit regions and a plurality of data regions are disposed alternately along spiral or concentric virtual track centers, each prepit region includes a pair of wobble pits for tracking servo, flat portions are present on a surface of the substrate before and after the wobble pits along the virtual track center, and a length M ($\mu$m) of the flat portion along the virtual track center, a wavelength $\lambda$ ($\mu$m) of the laser beam and the NA satisfy a relationship: $0.65 \leq M \cdot NA/\lambda$. In the second information recording medium, even when a tangential tilt occurs, tracking control can be conducted with reliability. Therefore, for example, information can be reproduced by using the DWDD method that is likely to be influenced by a residual error of tracking control, and a linear density can be enhanced.

In the first and second information recording media, one of the pair of wobble pits may be shared by two prepit regions that are adjacent in a radius direction of the substrate.

In the first and second information recording media, the prepit region may be divided into a plurality of zones that are arranged repeatedly in accordance with a distance from a center of the substrate, the pair of wobble pits may be composed of a first wobble pit that has two possible arrangements and a second wobble pit that has two possible arrangements, and the plurality of zones may have different combinations of the arrangement of the first wobble pit and the arrangement of the second wobble pit. According to this configuration, by detecting the position of a wobble pit, the radial movement direction of a laser beam spot can be detected.

In the first and second information recording media, grooves may be formed in portions corresponding to the data regions in the substrate. According to this configuration, a tracking system can be adopted in which a tracking error of push-pull tracking using grooves is corrected with wobble pits. In this case, compared with the tracking system using only wobble pits, the number of servo regions per track can be decreased. Therefore, high-density recording can be conducted. Furthermore, a recording/reproducing system can be adopted in which recording tracks are cut off magnetically as in the DWDD method. Therefore, a linear density can be enhanced.

In the first and second information recording media, the recording layer may include a first magnetic layer, a second magnetic layer, and a third magnetic layer disposed in this order from an incident side of the laser beam, a Curie temperature of the first magnetic layer and a Curie temperature of the third magnetic layer may be higher than a Curie temperature of the second magnetic layer, and the recording layer may be cut off magnetically between adjacent tracks. According to this configuration, information can be reproduced by the DWDD method.

In the first and second information recording media, the lengths of the prepit regions along the virtual track center may be constant.

In the first and second information recording media, a distance between each center of the pair of wobble pits and an end of the prepit region may be represented by an integral multiple of T/N, where T is a length of the prepit region along the virtual track center and N is an integer of 5 or more. Herein, the end of a prepit region refers to the end of a prepit region on the side a laser beam spot enters during reproduction. According to this configuration, it easily can be determined to which pattern a portion through which a light spot passes belongs.

Furthermore, a first recording/reproducing method of the present invention is a method for recording/reproducing information by irradiating an information recording medium with a laser beam condensed by an objective lens with a numerical aperture NA, wherein the information recording medium includes a disk-shaped substrate and a recording layer disposed on the substrate, a plurality of prepit regions and a plurality of data regions are disposed alternately along spiral or concentric virtual track centers on a surface of the substrate, each prepit region includes a pair of wobble pits for tracking servo, and a length L ($\mu$m) of the wobble pit along the virtual track center, a wavelength $\lambda$ ($\mu$m) of the laser beam, and the NA satisfy a relationship: $0.3 \leq L \cdot NA/\lambda \leq 0.65$.

Furthermore, a second recording/reproducing method of the present invention is a method for recording/reproducing information by irradiating an information recording medium with a laser beam condensed by an objective lens with a numerical aperture NA, wherein the information recording medium includes a disk-shaped substrate and a recording layer disposed on the substrate, a plurality of prepit regions and a plurality of data regions are disposed alternately along spiral or concentric virtual track centers on a surface of the substrate, each prepit region includes a pair of wobble pits for tracking servo, flat portions are present on the surface of the substrate before and after the wobble pits along the virtual track center, and a length M ($\mu$m) of the flat portion along the virtual track center, a wavelength $\lambda$ ($\mu$m) of the laser beam, and the NA satisfy a relationship: $0.65 \leq M \cdot NA/\lambda$.

In another point of view, the present invention relates to a recording/reproducing system using an information recording medium and a recording/reproducing method of the present invention.

BRIEF DESCRIPTION OF DRAWINGS

FIG. 16 schematically shows an exemplary recording/reproducing apparatus used in a recording/reproducing method of the present invention.

BEST MODE FOR CARRYING OUT THE INVENTION

Figure 1A:
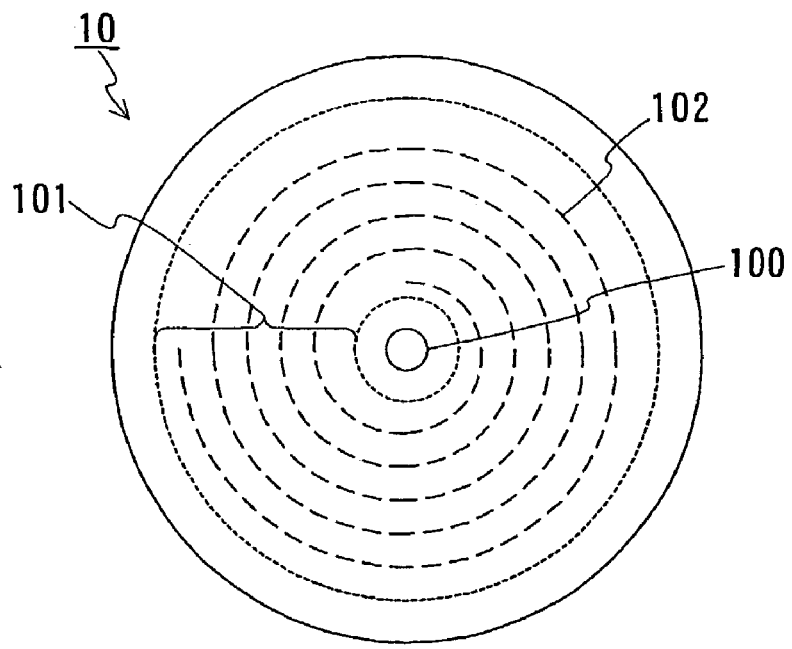
FIGS. 1A and 1B are plan views schematically showing an exemplary configuration of an information recording medium of the present invention.

Hereinafter, the present invention will be described by way of illustrative embodiments with reference to the drawings.

Embodiment 1

In Embodiment 1, a first information recording medium of the present invention will be described. The information recording medium of Embodiment 1 is irradiated with a laser beam condensed by an objective lens with a numerical aperture NA, whereby information is reproduced (or recorded). The information recording medium is provided with a disk-shaped substrate. On the surface of the substrate, a plurality of prepit regions and data regions are disposed alternately along spiral or concentric virtual track centers. The prepit region includes a pair of wobble pits for tracking servo. A length L ($\mu$m) of a wobble pit along the virtual track center and a spot diameter D ($\mu$m) of a laser beam along the virtual track center satisfy a relationship: $0.3 \leq (L/D) \leq 0.65$. Particularly, it is preferable that L and D satisfy a relationship: $0.4 \leq (L/D) \leq 0.55$. If the length of a wobble pit is within this range, even if the length of a wobble pit is varied, variations in an amplitude of a tracking control signal can be suppressed within several %. At this time, even if the width of a wobble pit has variations in a range of 0.4 times to 0.55 times a spot diameter, the amplitude of a tracking control signal hardly is influenced.

Herein, the virtual track center refers to a virtual line through which a spot of a laser beam radiated for recording/reproducing information is to pass during recording/reproducing of information. Wobble pits for tracking control and data regions are formed along the virtual track center.

Furthermore, a prepit refers to a convex portion or a concave portion previously formed on a substrate for the purpose of generating a particular signal during reproduction. A prepit includes, for example, a clock pit, a wobble pit, an address pit, and the like. The prepit generally has the shape of a circle, an oval, or a rectangle when viewed from above.

A spot diameter D ($\mu$m) (i.e., spot diameter in a tangential direction) of a laser beam along the virtual track center is represented by a formula: $D = \lambda/NA$, where NA represents a numerical aperture of an objective lens of an optical head used for reproducing information and $\lambda$ represents a wavelength ($\mu$m) of a laser beam used for reproducing information. Thus, the information recording medium of Embodiment 1 satisfies a relationship: $0.3 \leq L \cdot NA/\lambda 0.65$, preferably $0.4 \leq L \cdot NA/\lambda \leq 0.55$.

In the information recording medium of Embodiment 1, the wavelength $\lambda$ is, for example, in a range of 400 $\mu$m to 780 $\mu$m. Furthermore, the numerical aperture NA is, for example, in a range of 0.55 to 0.85. Furthermore, the spot diameter D (=$\lambda$/NA) preferably is in a range of 0.47 $\mu$m to 1.42 $\mu$m.

In the information recording medium, prepit regions in which prepits are formed are disposed separately on a disk. The arrangement of the prepit regions can be varied depending upon a rotation method of a disk. For example, the prepit regions may be disposed radially. Furthermore, the prepit regions may be disposed at a predetermined interval along the virtual track center. The lengths of the prepit regions along the virtual track center may be constant over the entire information recording medium, or may be longer toward an outer periphery.

In the prepit region, prepits such as clock pits and address pits are provided, if required, in addition to wobble pits. There are flat portions on the surface of the substrate before and after the wobble pits along the virtual track center. Herein, the flat portion refers to a region where prepits and pre-grooves (i.e., those previously formed on the substrate) are not formed. More specifically, the flat portion refers to a region where unevenness is not formed on the substrate. It is preferable that a length M ($\mu$m) of the flat portion along the virtual track center and a spot diameter D ($\mu$m) of a laser beam along the virtual track center satisfy a relationship: $0.65 \leq (M/D)$. More specifically, it is preferable that the length M ($\mu$m), the wavelength $\lambda$ ($\mu$m), and the numerical aperture NA satisfy a relationship: $0.65 \leq M \cdot NA/\lambda$.

The information recording medium of Embodiment 1 includes a recording layer disposed on the substrate. In the data region, information is recorded onto the recording layer. As the recording layer, a layer made of a magnetic substance in which information is recorded in magnetic domains can be used. As a method for recording information, for example, an optical pulse magnetic field modulation system can be used that conducts recording by modulating a magnetic field while irradiating a laser beam in a pulse manner.

The information recording medium of Embodiment 1 allows tracking control to be conducted with reliability and high-density recording to be achieved, as described later in the examples.

Embodiment 2

In Embodiment 2, another information recording medium of the present invention will be described. The information recording medium of Embodiment 2 is irradiated with a laser beam condensed by an objective lens with a numerical aperture NA, whereby information is reproduced (or recorded). The information recording medium is provided with a disk-shaped substrate. On the surface of the substrate, a plurality of prepit regions and data regions are disposed alternately along spiral or concentric virtual track centers. The prepit region includes a pair of wobble pits for tracking servo. There are flat portions on the surface of the substrate before and after the wobble pits along the virtual track center. A length M ($\mu$m) of the flat portion along the virtual track center and a spot diameter D ($\mu$m) of a laser beam along the virtual track center satisfy a relationship: $0.65 \leq (M/D)$. When represented by using a wavelength $\lambda$ ($\mu$m) of a laser beam to be radiated and a numerical aperture NA of an objective lens, the length M, the wavelength $\lambda$, and the numerical aperture NA of an objective lens satisfy a relationship: $0.65 \leq M \cdot NA/\lambda$.

The flat portion, the virtual track center, the prepit, the spot diameter D ($\mu$m), the data region, and the recording layer are the same as those in the information recording medium of Embodiment 1. Therefore, the description will not be repeated here.

The information recording medium of Embodiment 2 allows tracking control to be conducted with reliability and high-density recording to be achieved, as described later in the examples.

Embodiment 3

In Embodiment 3, a recording/reproducing method of the present invention will be described. According to a first recording/reproducing method of the present invention, the information recording medium of Embodiment 1 is irradiated with a laser beam condensed by an objective lens with a numerical aperture NA, whereby recording/reproducing is conducted. According to a second recording/reproducing method of the present invention, the information recording medium of Embodiment 2 is irradiated with a laser beam condensed by an objective lens with a numerical aperture NA, whereby recording/reproducing is conducted.

As a recording/reproducing apparatus used in the recording/reproducing method of the present invention, a general recording/reproducing apparatus can be used.

According to the first recording/reproducing method of the present invention, a length L ($\mu$m) of a wobble pit along a virtual track center, a wavelength $\lambda$ ($\mu$m) of a laser beam, and a numerical aperture NA of an objective lens satisfy a relationship: $0.3 \leq L \cdot NA/\lambda 0.65$, preferably $0.4 \leq L \cdot NA/\lambda \leq 0.55$. According to the second recording/reproducing method of the present invention, a length M ($\mu$m) of the above-mentioned flat portion, a wavelength $\lambda$ ($\mu$m) of a laser beam, and a numerical aperture NA of an objective lens satisfy a relationship: $0.65 \leq M \cdot NA/\lambda$.

EXAMPLES

Hereinafter, the present invention will be described in detail by way of illustrative examples.

Example 1

Figure 1B:
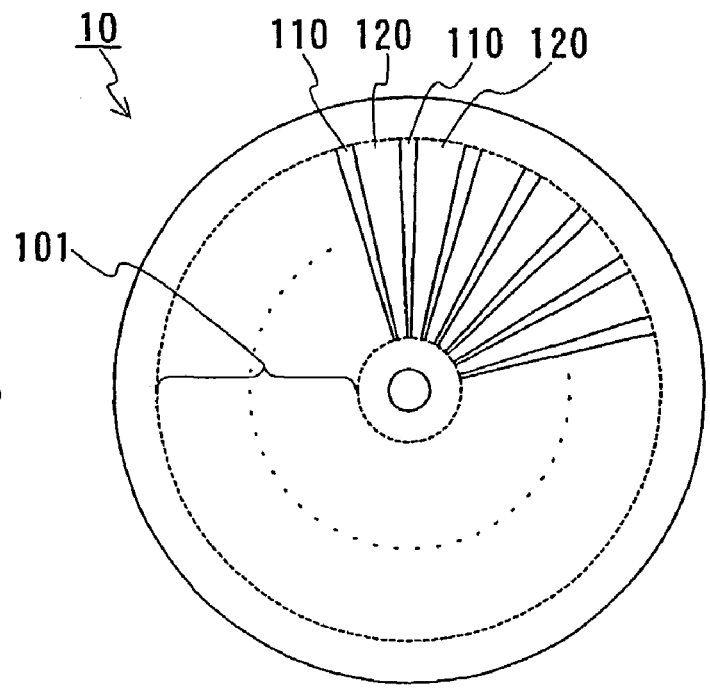

In Example 1, an example of an information recording medium of the present invention will be described. FIG. 1A shows a plan view of an information recording medium 10 of Example 1. The information recording medium 10 is a magnetooptical disk of a sample servo tracking system. The information recording medium 10 has a disk shape with a diameter of about 50 mm, and is provided with a through-hole 100 at the center. A recording region 101 is formed in a range of a radius of 11 mm to 25 mm on the information recording medium 10. A virtual track center 102 is disposed in a spiral shape in the recording region 101. A track pitch (distance between the virtual track centers 102 adjacent in the radius direction) is 0.6 $\mu$m. FIG. 1B shows the arrangement of prepit regions and data regions of the information recording medium 10 A plurality of radially disposed prepit regions 110 and a plurality of radially disposed data regions 120 are placed alternately. In one track, 1280 prepit regions 110 and 1280 data regions 120 are disposed.

Figure 1C:
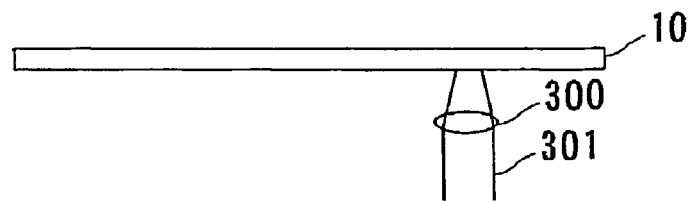
FIG. 1C is a cross-sectional view schematically showing a reproduction state.

As shown in FIG. 1C, the information recording medium 10 is irradiated with a laser beam 301 having a wavelength $\lambda$ ($\mu$m) condensed by an objective lens 300 with a numerical aperture NA, whereby recording/reproducing is conducted.

Figure 2:
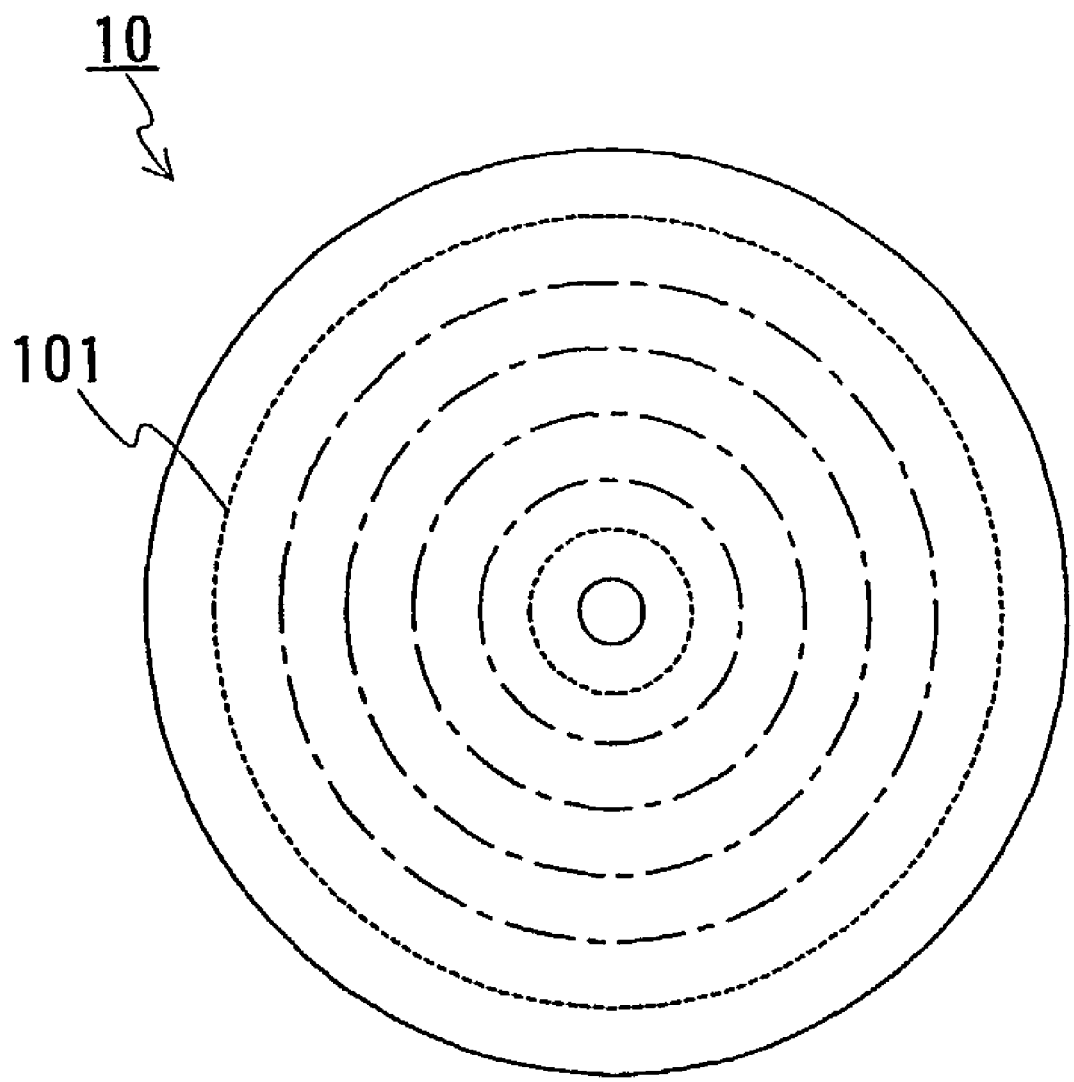
FIG. 2 is a plan view schematically showing a configuration of the information recording medium shown in FIGS. 1A, 1B, and 1C.

As shown in FIG. 2, the recording region 101 of the information recording medium 10 is divided into a plurality of zones in the radius direction. The information recording medium 10 adopts a Zoned Constant Linear Velocity (ZCLV) system in which recording/reproducing is conducted at a substantially constant linear velocity in the entire recording region 101 by switching a rotation angular velocity on a zone basis.

Figure 3:
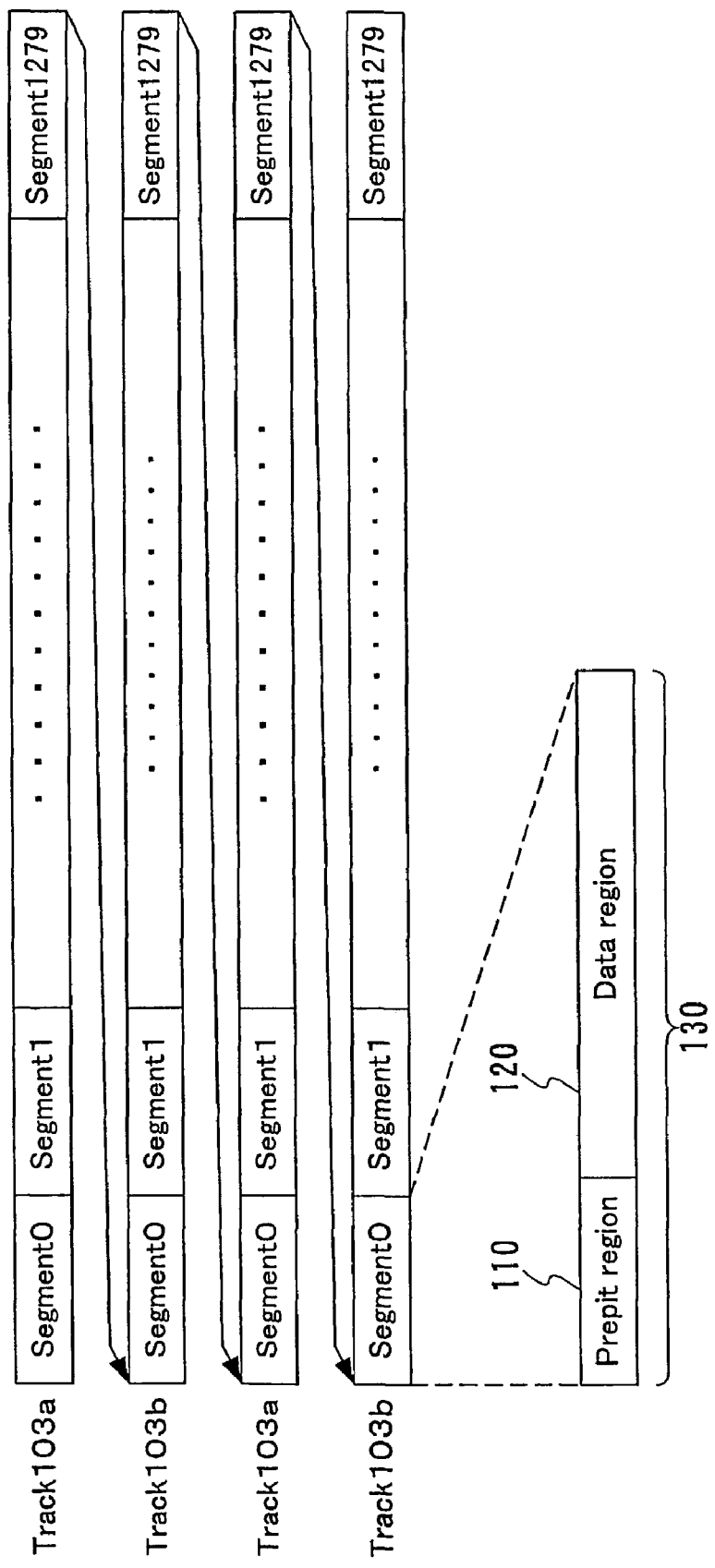
FIG. 3 schematically shows a configuration of segments of the information recording medium shown in FIG. 1A, 1B, and 1C.

FIG. 3 is a partially enlarged view showing a configuration of segments 130 of the information recording medium 10. Referring to FIG. 3, each segment 130 includes the prepit region 110 and the data region 120. More specifically, the information recording medium 10 includes 1280 segments per track. The data region 120 is used for recording user data.

Figure 4:
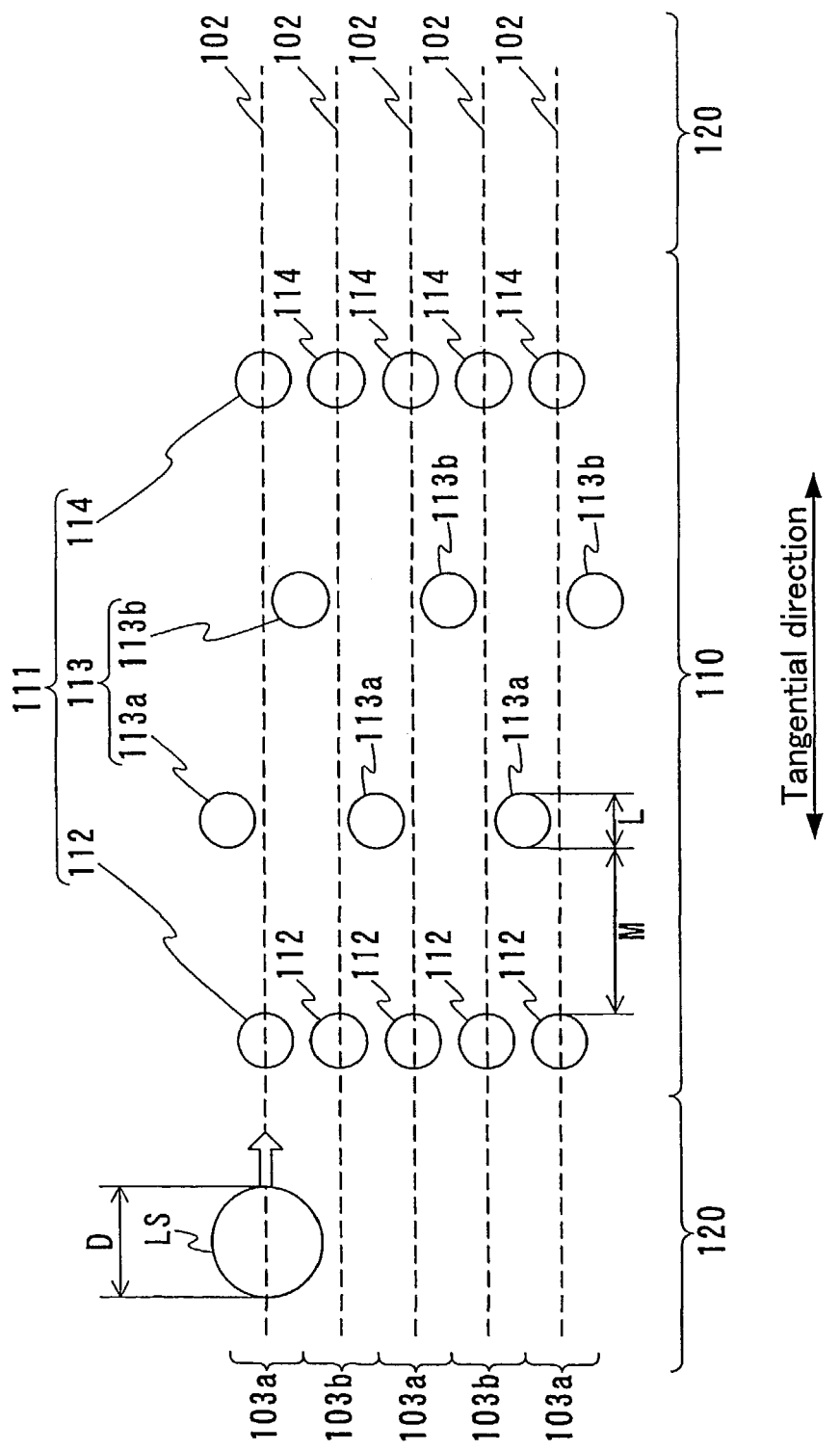
FIG. 4 schematically shows a configuration of a prepit region of the information recording medium shown in FIG. 1A, 1B, and 1C.

FIG. 4 schematically shows a configuration of the prepit region 110. In the prepit region 110, prepits 111 are formed. The prepits 111 include a clock pit 112, a pair of wobble pits 113, and an address pit 114 in this order from the leading end (i.e., the side a spot of a laser beam passes first during recording/reproducing of information). The width (length in the radius direction) of each prepit 111 is 0.4 μm. A spot LS of a laser beam moves in a direction represented by an arrow in FIG. 4. Furthermore, flat portions 11p (see FIG. 8) are formed before and after the wobble pits 113a and 113b along the virtual track center 102. In the flat portions lip, the prepits 111 are not formed.

The clock pit 112 is used for generating a synchronizing clock signal, and disposed on the virtual track center 102.

A pair of wobble pits 113 include a wobble pit 113a and a wobble pit 113b. The wobble pits 113a and 113b are disposed at positions shifted from the virtual track center 102 by a ½ track pitch. One of wobble pits 113 is shared by the wobble pits of the adjacent tracks. Therefore, in the information recording medium 10, a track 103a and a track 103b having different polarities of tracking control signals are disposed alternately in the radius direction.

The address pit 114 is used for generating a signal regarding positional information. One address pit 114 is provided per segment 130. Eighty address pits 114 form one address information. More specifically, 16 (1280/80) pieces of address information are recorded per track in the information recording medium 10.

In the information recording medium 10, a length L (μm) of the wobble pit 113 along the virtual track center 102 and a spot diameter D (μm) of a laser beam to be radiated during reproduction of information along the virtual track center 102 satisfy a relationship: $0.3 \leq L/D \leq 0.65$. In the case where the spot diameter D is about 1.1 μm, the length L is, for example, 0.4 μm.

Figure 5:
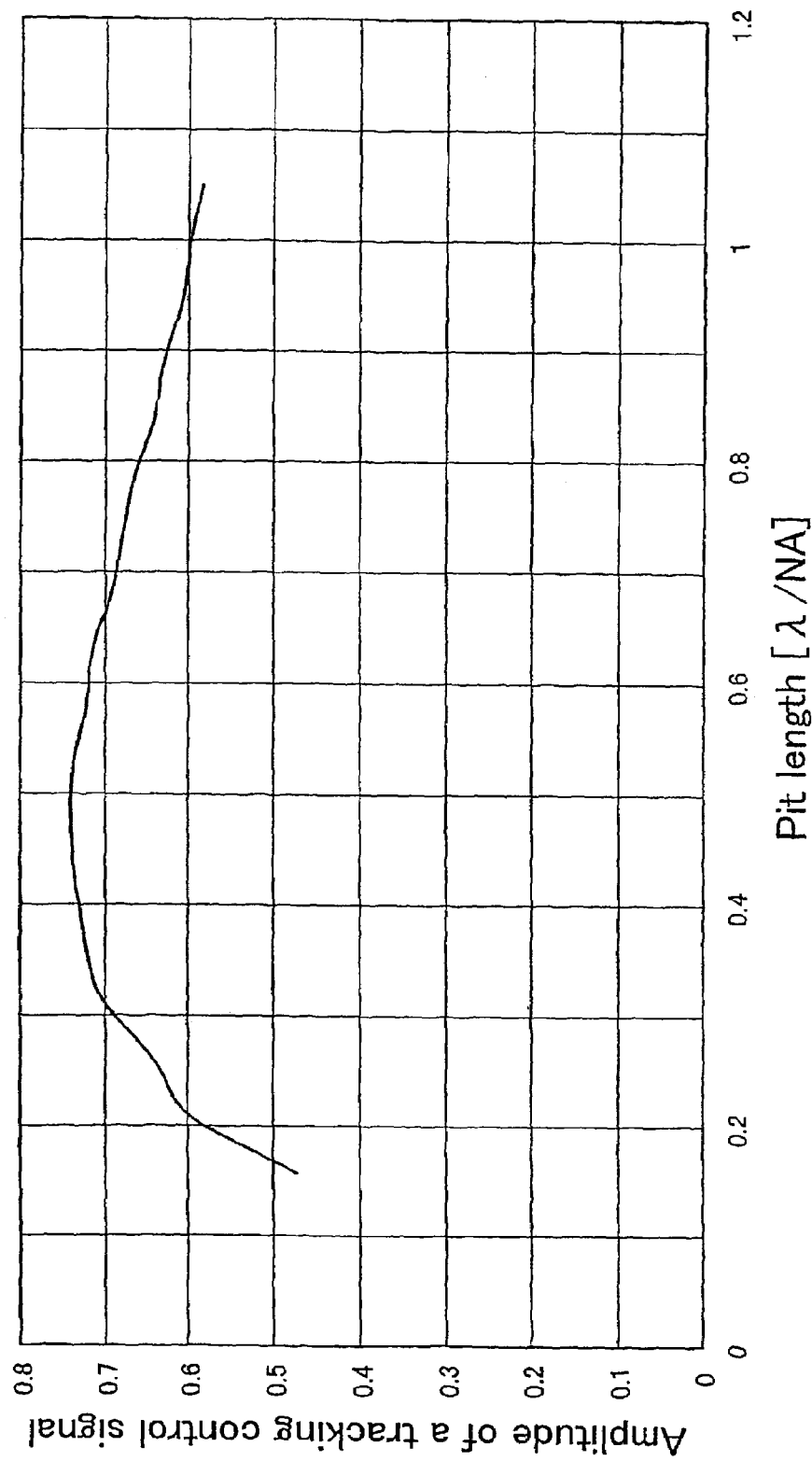
FIG. 5 is a graph showing a relationship between a length of a wobble pit and an amplitude of a tracking control signal.

For reference, FIG. 5 shows simulation results regarding changes in the amplitude of a tracking control signal when the length L of a prepit is changed. Herein, it is assumed that an optical system used for reproduction of information includes a semiconductor laser with a wavelength λ of 0.65 μm and a lens with a numerical aperture NA of 0.6. Thus, the spot diameter D of a laser beam condensed onto the information recording medium 10 is about 1.1 μm (λ/NA). The horizontal axis in FIG. 5 represents a length L (normalized by λ/NA) of a wobble pit along the virtual track center 102. That is, a value on the horizontal axis represents an (L/D) value. For example, the value "1" on the horizontal axis represents that the pit length L is 1.1 μm. Furthermore, the vertical axis in FIG. 5 represents an amplitude of a tracking control signal standardized with a reproduction signal on a mirror surface (flat portion without prepits).

It is understood from FIG. 5 that an amplitude of a tracking control signal can be made substantially constant by prescribing the length L (μm) of a wobble pit to be in a range of about 0.3 times to about 0.65 times the spot diameter D (μm). More specifically, when the length L (μm) and the spot diameter D (μm) satisfy a relationship: $0.3 \leq (L/D) \leq 0.65$, tracking control can be conducted with reliability. Furthermore, by prescribing the length L (μm) to be 0.65 times or less the spot diameter D (μm), high-density recording can be conducted.

Figure 6:
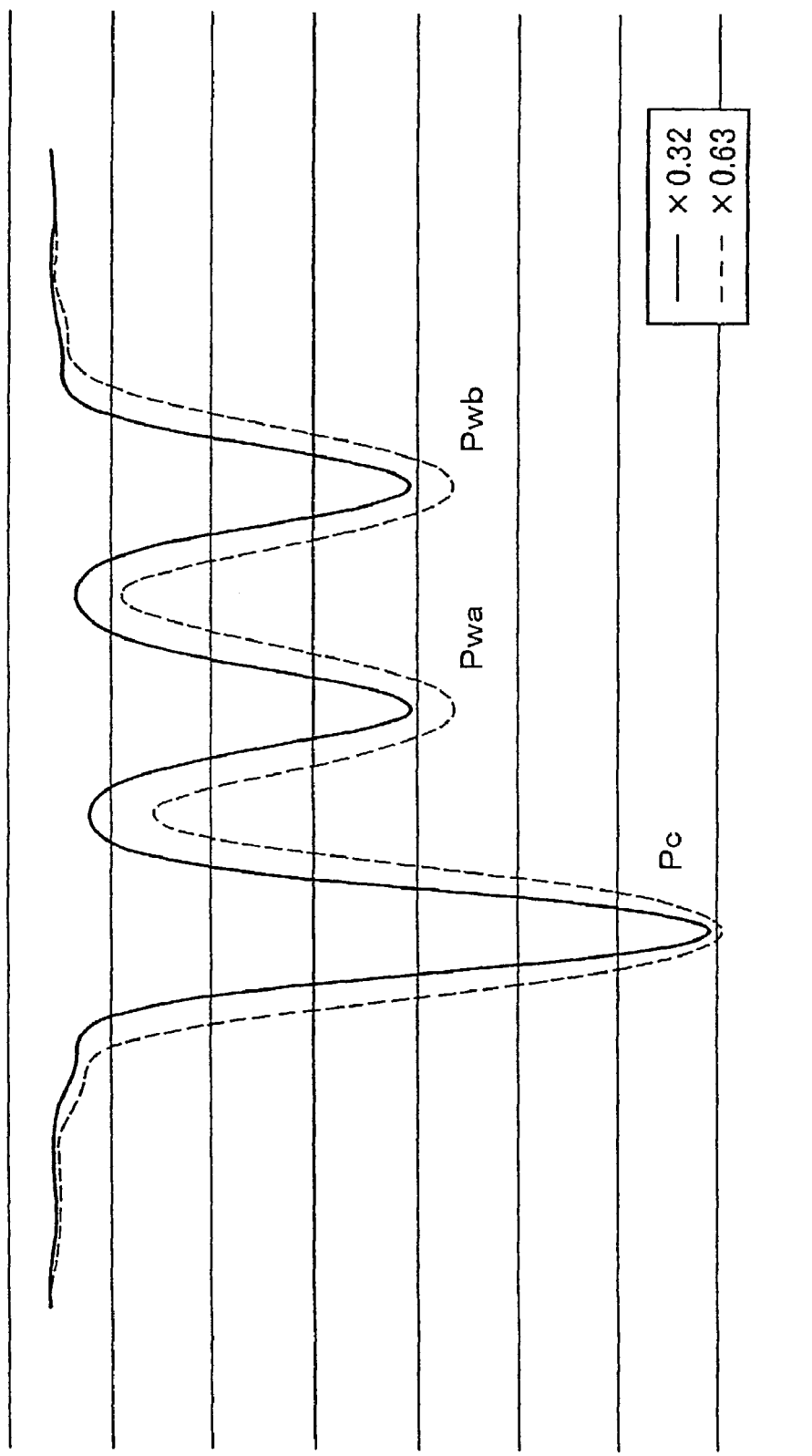
FIG. 6 is a diagram showing an exemplary waveform of a reproduction signal in the case where the length of a prepit is 0.32 times or 0.63 times a spot diameter.

FIG. 6 shows waveforms of reproduction signals when a length L' (μm) of a prepit along the virtual track center is 0.32 times (solid line in FIG. 6) or 0.63 times (broken line in FIG. 6) the spot diameter D (μm) along the virtual track center. A peak Pc represents a reproduction signal of the clock pit 112, a peak Pwa represents a reproduction signal of the wobble pit 113a, and a peak Pwb represents a reproduction signal of the wobble pit 113b. In both the case of L'=0.32 D and the case of L'=0.63 D, a flat portion is not present in a reproduction waveform of a prepit. Thus, in this case, the central position of a prepit easily can be detected by using a differential signal of a reproduction signal or a tangential push-pull signal. An output of PLL can be synchronized with the center of the clock pit 112 based on information at the central position of a prepit. Furthermore, as described in Example 2, by detecting the positions of the wobble pits 113a and 113b, the moving direction of a laser beam can be detected.

Next, the flat portions 11p (see FIG. 8) formed before and after the wobble pits along the virtual track center 102 will be described. In the information recording medium 10, a length M (μm) of the flat portion along the virtual track center 102 and a spot diameter D (μm) of a laser beam along the virtual track center 102 satisfy a relationship: $0.65 \leq (M/D)$. In the case where the spot diameter is about 1.1 μm, the length M is, for example, 0.88 μm.

Figure 7:
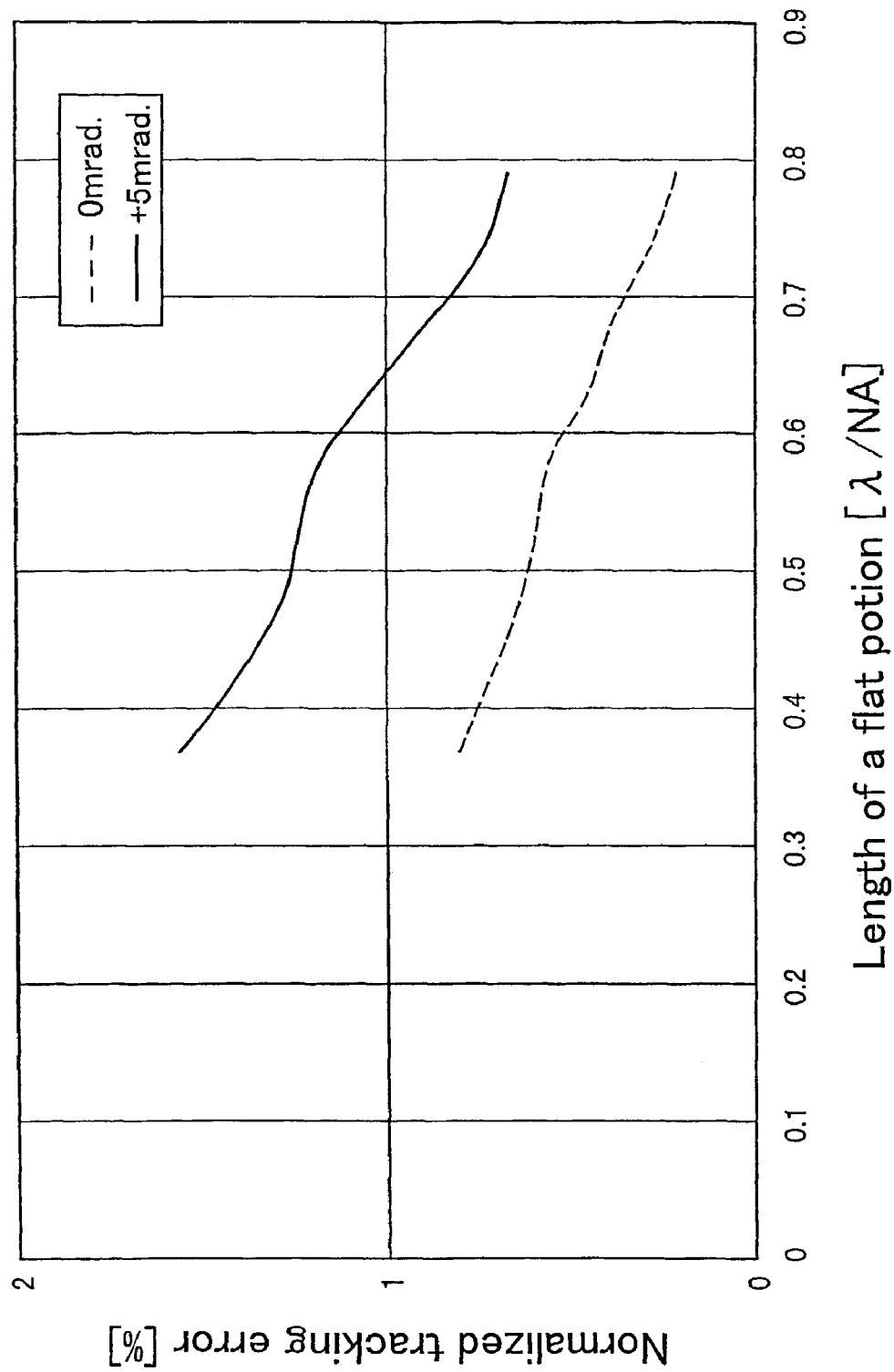
FIG. 7 is a graph showing a relationship between a length of a flat portion and a normalized tracking error.

For reference, FIG. 7 shows simulation results regarding a relationship between the length M and the normalized tracking error. Herein, it is assumed that an optical system used for reproduction of information is the same as that in the simulation in FIG. 5. A normalized tracking error (%) on the vertical axis represents a value calculated by (tracking error/track pitch)×100. Furthermore, the horizontal axis represents a value normalized by (λ/NA), i.e., the spot diameter D (μm). More specifically, a value on the horizontal axis represents an (M/D) value. For example, the state where the value on the horizontal axis is 1 represents that the length M of the flat portion is 1.1 μm. Furthermore, in FIG. 7, a broken line represents the results in the case where there is no tangential tilt, and a solid line represents the results in the case where a tangential tilt occurs at 5 mrad.

In order to reproduce information with reliability, it is required to decrease a normalized tracking error even in the case where a tangential tilt occurs. Particularly, in the case of using a recording layer for conducting reproduction by Domain Wall Displacement Detection Method (hereinafter, which may be referred to as a "DWDD method"), recording/reproducing characteristics during a tracking error are not satisfactory, so that it is required to further decrease a normalized tracking error. More specifically, in the case where a tangential tilt of 5 mrad occurs, it is preferable that a normalized tracking error is 1% or less of a track pitch. Thus, it is understood from FIG. 7 that it is preferable to prescribe the length M of a flat portion to be 0.65 times or more the spot diameter D. More specifically, when the length M (μm) and the spot diameter D (μm) satisfy a relationship: $0.65 \leq (M/D)$, tracking control can be conducted reliably.

Figure 8:
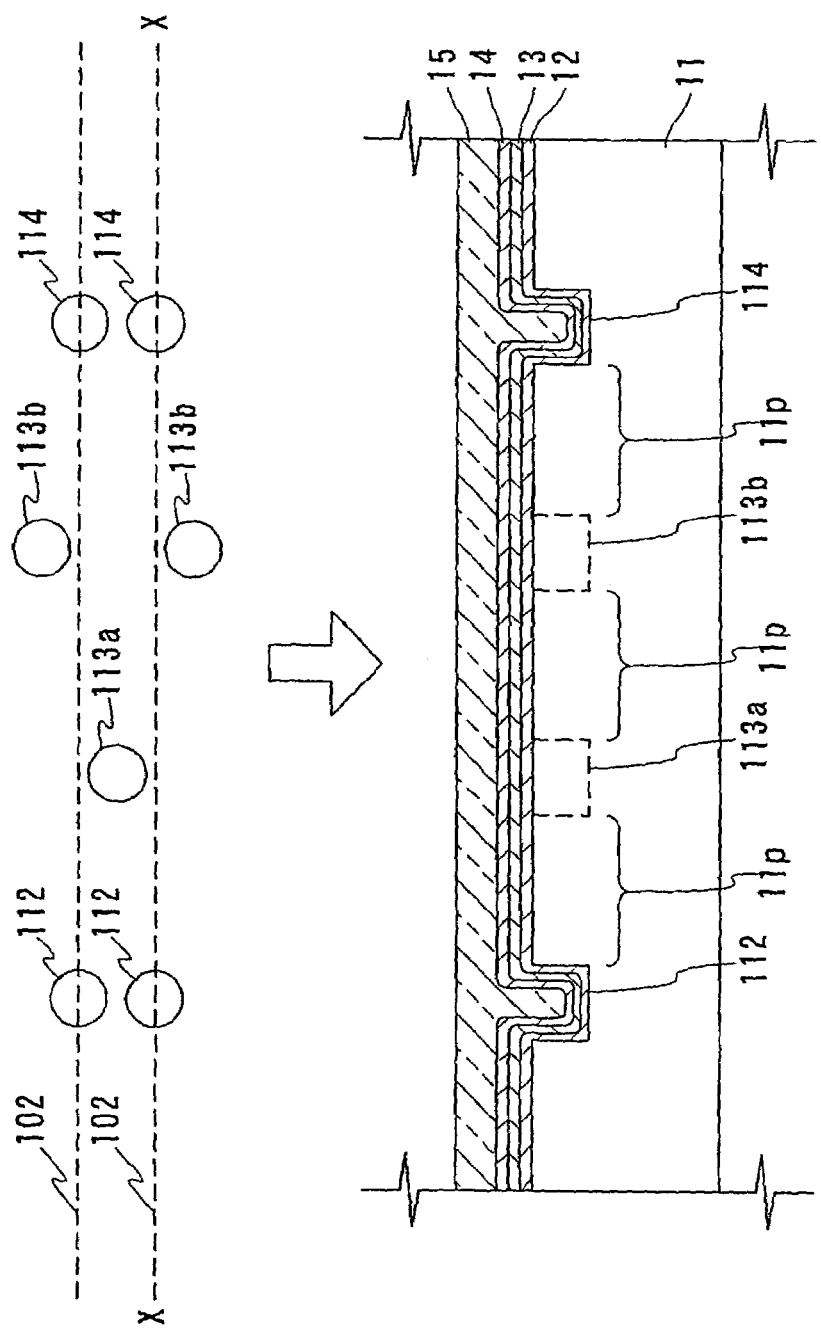
FIG. 8 schematically shows a configuration of a prepit region of the information recording medium shown in FIGS. 1A, 1B, and 1C.

Next, a configuration of the information recording medium 10 will be described. FIG. 8 shows a partial cross-sectional view of the information recording medium 10 along the virtual track center 102.

Referring to FIG. 8, the information recording medium 10 includes a disk-shaped substrate 11 (hatching is omitted), and a dielectric layer 12, a magnetic layer 13, a dielectric layer 14, and an overcoat layer 15 stacked in this order on the substrate 11. In the prepit region 110, concave portions to be the clock pit 112, the wobble pits 113, and the address pits 114 are formed. Portions where prepits are not formed along the virtual track center 102 correspond to the flat portions 11p. A laser beam for recording/reproducing is radiated from the substrate 11 side.

The substrate 11 can be made of, for example, polycarbonate resin, polyolefin resin, or the like. The dielectric layers 12 and 14 can be made of, for example, a nitride such as SiN and AlN, an oxide such as $SiO_2$ and $Al_2O_3$, or a chalcogen type material such as ZnS and ZnTe. The magnetic layer 13 can be made of, for example, a multi-layered film composed of a combination of TbFeCo and TbFeCoCr, or TbDyFeCo, TbFe, and GdFeCo. UV-curable resin such as epoxy type UV-curable resin and urethane type UV-curable resin are examples that can be used for the overcoat layer 15.

Next, an exemplary method for producing the information recording medium 10 will be described with reference to FIG. 8. First, the substrate 11 is formed by injection forming using a stamper, a 2P method (photopolymer method), or the like. Then, the dielectric layer 12, the magnetic layer 13, and the dielectric layer 14 are formed successively. These layers can be formed by sputtering or vapor deposition. Thereafter, the overcoat layer 15 is formed. The overcoat layer 15 can be formed by coating the dielectric layer 14 with UV-curable resin by spin coating and curing the UV-curable resin by irradiation with UV-light.

Next, a method for producing a master stamper for forming the pits on the substrate will be described. The master is formed by coating a glass substrate with a photoresist, exposing a part of the photoresist to light by irradiation with a laser beam (cutting), and removing the irradiated portion. More specifically, the master is rotated at a constant rotation number, and irradiated with a laser beam while the laser beam is moved from an inner side to an outer side, whereby cutting is conducted.

Herein, in the case where unevenness corresponding to the prepits 111 is formed by cutting with a laser beam driven at a current modulated with the same pulse width irrespective of the position of the master, the length of a prepit becomes larger in accordance with the distance from the center of the master for the following reason. The rotation angular velocity of the master is constant, so that the relative movement speed of the master with respect to a laser beam is increased with distance from the center of the master.

Herein, it is assumed that a laser beam (wavelength: 0.35 $\mu$m) driven at a constant driving pulse width is condensed by a lens with a numerical aperture NA of 0.9 to conduct cutting. It also is assumed that the spot diameter of a laser beam for reproducing a signal is 1.1 $\mu$m. It also is assumed that the length of a prepit in the innermost track (radius: 11 mm) is equal to a spot diameter of a laser beam used for cutting. In this case, the length of a prepit in the innermost track (radius: 11 mm) becomes 0.35/0.9=0.4 ($\mu$m)>0.3×(spot diameter of a laser beam for reproducing a signal). On the other hand, the length of a prepit in the outermost track (radius: 25 mm) becomes (0.4/11)×25=0.9 ($\mu$m)>0.65×(spot diameter of a laser beam for reproducing a signal). Thus, when the rotation angular velocity of the master and the driving pulse width of a laser beam are prescribed to be constant, it becomes difficult to achieve the relationship between the length L ($\mu$m) of a prepit and the spot diameter D ($\mu$m) of a laser beam for reproducing a signal determined in the present invention, i.e., $0.3 \leq (L/M) \leq 0.65$.

Figure 9:
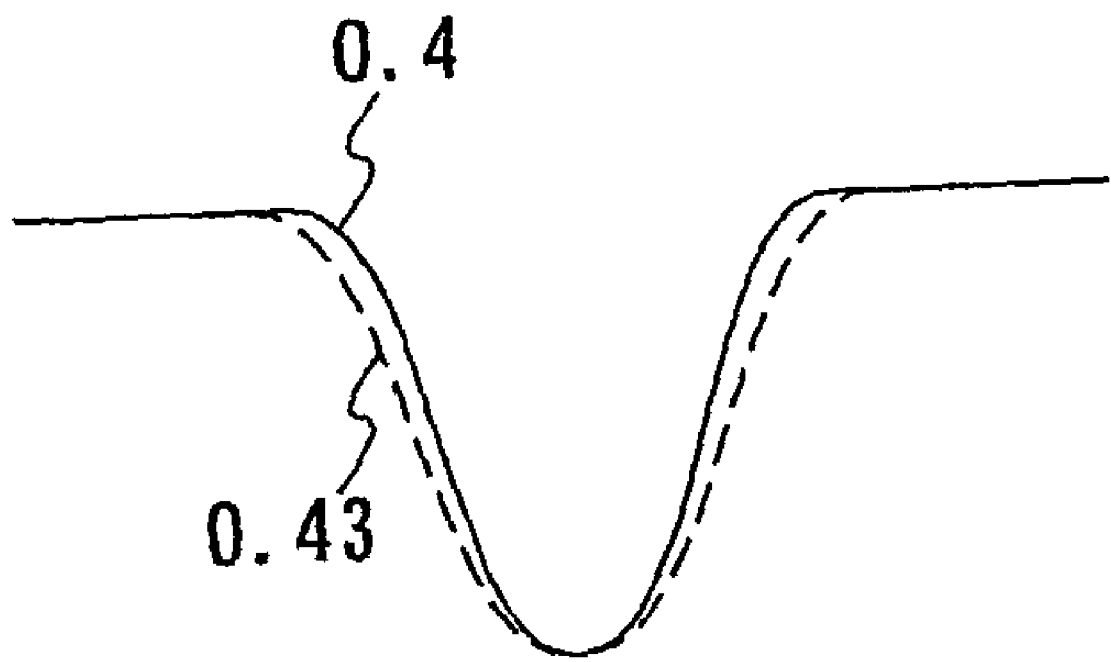
FIG. 9 is a view showing an exemplary reproduction signal of a prepit of the information recording medium shown in FIGS. 1A, 1B, and 1C.

When the master of the information recording medium 10 is produced, the driving pulse width of a laser beam used for cutting is changed on the basis of 1000 tracks. More specifically, a disk is partitioned into sections on the basis of 1000 tracks, and the length of a prepit in the innermost track in the section is prescribed to be 0.4 $\mu$m. In the same section, cutting is conducted at the same driving pulse width. A driving pulse width of a laser beam is set to be shorter successively in sections on the outer side, whereby cutting is conducted. Because of this, in each section, the length of a prepit in the innermost track always becomes 0.4 $\mu$m. In each section, the length of a prepit of the outermost track becomes slightly longer than 0.4 $\mu$m. However, the width of each section is only 600 $\mu$m (1000 tracks), so that the length of a prepit can be set to be 0.43 $\mu$m or less. FIG. 9 shows examples of a reproduction signal of a prepit with a length of 0.4 $\mu$m, and a reproduction signal of a prepit with a length of 0.43 $\mu$m. The reproduction signal (represented by a broken line in FIG. 9) of a prepit with a length of 0.43 $\mu$m has a decrease peak of the amount of reflected light wider than that of a reproduction signal (represented by a solid line in FIG. 9) with a length of 0.4 $\mu$m. However, with either prepit, the reproduction signal takes a local minimum value at the central portion of a prepit, and a slope of the signal is changed largely before and after the central portion. Therefore, in the information recording medium of Example 1, the central position of a prepit easily can be detected.

A nickel film is formed on the surface of the master thus produced to obtain a stamper. The substrate 11 can be formed by a 2P method or injection forming, using the stamper.

Example 2

In Example 2, another example of the information recording medium of the present invention will be described. In an information recording medium 20 of Example 2, grooves (pre-grooves) corresponding to data regions of a substrate are formed. In the information recording medium 20, recording information is reproduced by the DWDD method. Furthermore, in the information recording medium 20, wobble pits are patterned on the basis of 20 tracks, and a moving direction of an optical head can be detected by detecting the wobble pits.

Figure 10A:
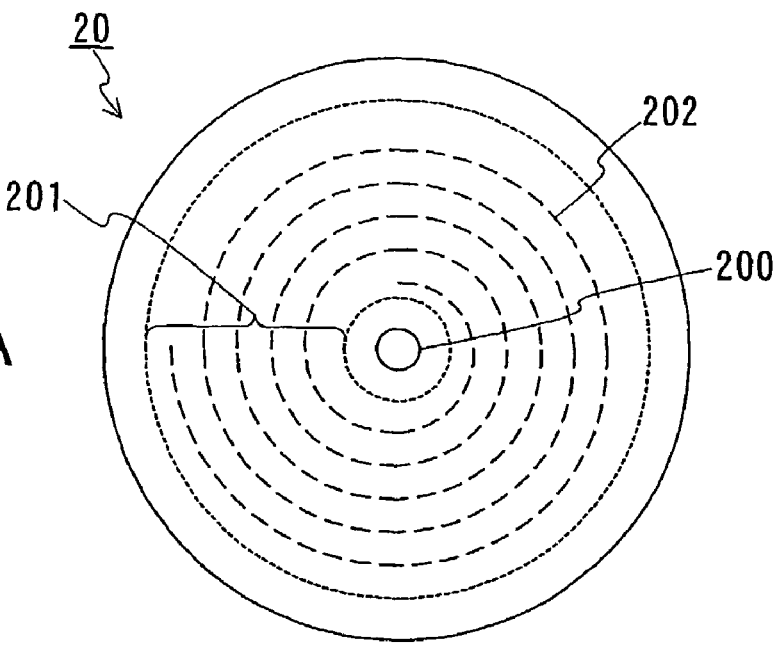
FIGS. 10A and 10B are plan views schematically showing another exemplary configuration of the information recording medium of the present invention.
Figure 10B:
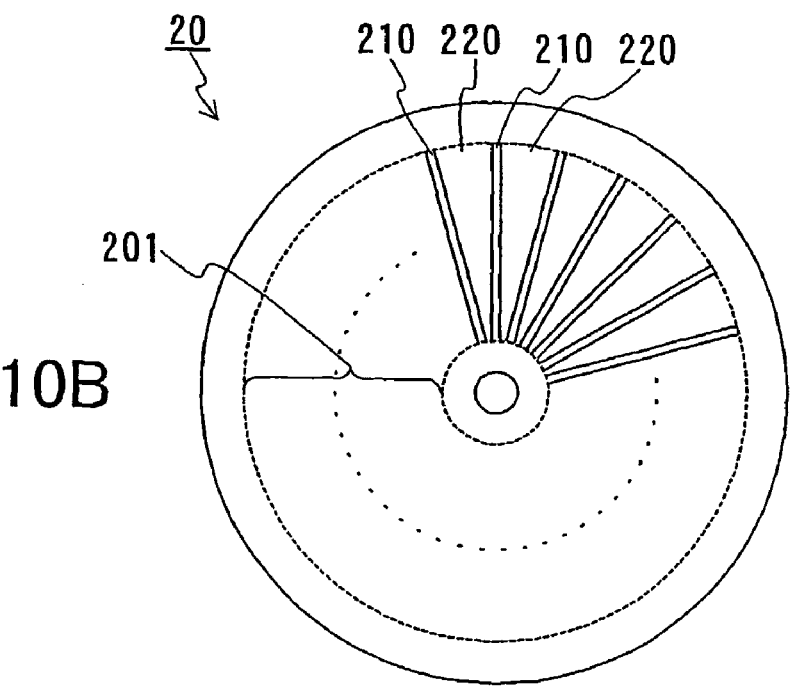

FIG. 10A is a plan view of the information recording medium 20 of Example 2. The information recording medium 20 is a magnetooptical disk of a sample servo tracking system. The information recording medium 20 has a disk shape with a diameter of about 50 mm, and is provided with a through-hole 200 at the center. A recording region 201 is formed in a range of a radius of 11 mm to 25 mm on the information recording medium 20. A virtual track center 202 is disposed in a spiral shape in the recording region 201. A track pitch (distance between the virtual track centers 202 adjacent in the radius direction) is 0.54 $\mu$m. FIG. 10B shows arrangement of prepit regions and data regions of the information recording medium 20. A plurality of radially disposed prepit regions 210 and a plurality of radially disposed data regions 220 are placed alternately. In one track, 1280 prepit regions 210 and 1280 data regions 220 are provided.

As shown in FIG. 10B, the information recording medium 20 of Example 2 is characterized in that the lengths of the prepit regions 210 are the same in a disk, compared with the information recording medium of Example 1. In Example 1, the prepit regions 210 become wider toward the outer peripheral side of the disk. In contrast, in the information recording medium 20, the prepit regions 210 have the same length, and in all the regions of the disk, the length of wobble pits and the interval between wobble pits are the same in the prepit region 210. Therefore, in the information recording medium 20, a more uniform tracking control signal can be generated in the disk, and tracking control with higher precision can be conducted, compared with the information recording medium 10. Furthermore, the substrate of the information recording medium 10 is a flat plate, whereas pre-grooves are formed in the data region 220 in the information recording medium 20.

Figure 10C:
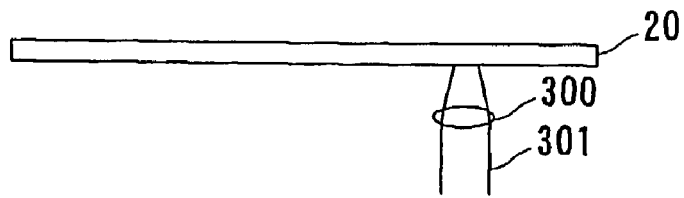
FIG. 10C is a cross-sectional view schematically showing a reproduction state.

As shown in FIG. 10C, the information recording medium 20 is irradiated with a laser beam 301 with a wavelength $\lambda$ ($\mu$m) condensed by an objective lens 300 with a numerical aperture NA, whereby recording/reproducing is conducted.

In the same way as in the information recording medium 10, the recording region 201 of the information recording medium 20 is divided into a plurality of zones in the radius direction (see FIG. 10). The information recording medium 20 adopts a ZCLV system in which recording/reproducing is conducted at a substantially constant linear velocity in the entire recording region 201 by switching a rotation angular velocity on a zone basis.

Figure 11:
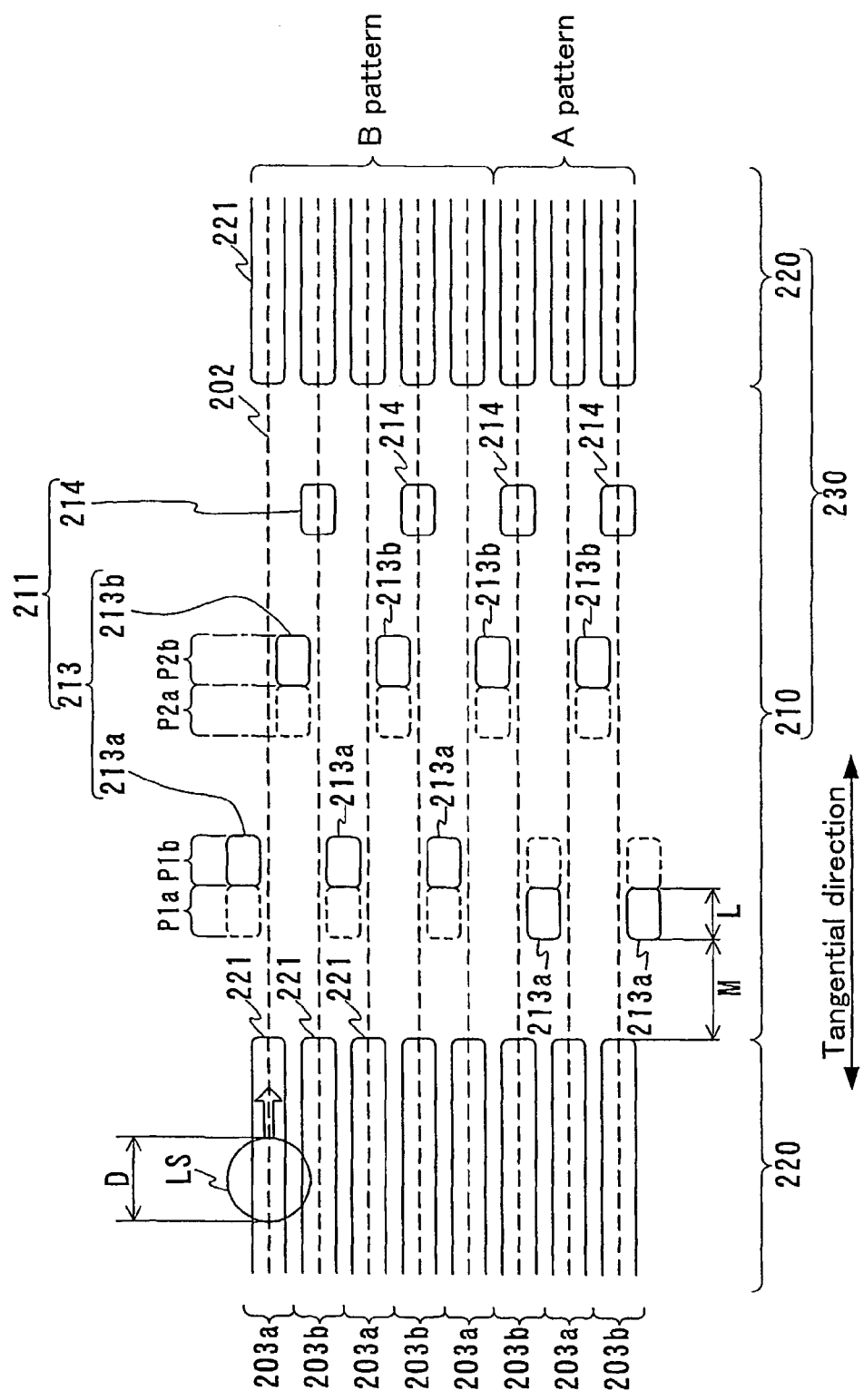
FIG. 11 schematically shows a configuration of segments of the information recording medium shown in FIGS. 10A, 10B, and 10C.

FIG. 11 is a partially enlarged view showing a configuration of segments 230 of the information recording medium 20. Referring to FIG. 11, each segment 230 includes the prepit region 210 and the data region 220. More specifically, the information recording medium 20 includes 1280 segments per track. The data region 220 is used for recording user data.

In the prepit region 210, prepits 211 are formed. The prepits 211 include a pair of wobble pits 213 and an address pit 214 in this order from the leading end (i.e., the side a spot of a laser beam passes first during recording/reproducing of information). The width (length in the radius direction) of each prepit 211 is 0.4 µm. Furthermore, flat portions are formed before and after the prepits 211 along the virtual track center 202.

The address pit 214 is a prepit similar to the address pit 114. described in Example 1.

In the information recording medium 20, a length L (µm) of the wobble pit 213 along the virtual track center and a spot diameter D (µm) of a laser beam radiated during reproduction of information satisfy a relationship: $0.3 \leq (L/D) \leq 0.65$. In the case where the spot diameter D is about 1.1 µm, the length L is, for example, 0.4 µm.

Furthermore, in the information recording medium 20, a length M (µm) of the flat portion along the virtual track center 202 and the spot diameter D (µm) of a laser beam along the virtual track center 202 satisfy a relationship: $0.65 \leq (M/D)$. In the case where the spot diameter is about 1.1 µm, the length M is, for example, 0.88 µm.

In the information recording medium 20, a clock pit is not formed in the prepit region 210. A synchronizing clock signal is generated by detecting an edge of the pre-grooves 221 formed in the data region 220.

A pair of wobble pits 213 include a wobble pit 213a (hereinafter, which may be referred to as a "first wobble pit 213a") and a wobble pit 213b (hereinafter, which may be referred to as a "second wobble pit 213b") in this order from the leading end. The wobble pits 213a and 213b are disposed at positions shifted from the virtual track center 102 by a ½ track pitch. One of a pair of wobble pits 213 is shared by the prepit regions 210 that are adjacent in the radius direction. Therefore, in the information recording medium 20, a track 203a and a track 203b having different polarities of tracking control signals are disposed alternately in the radius direction.

In the information recording medium 20, the wobble pits 213 are patterned. More specifically, the first wobble pit 213a is disposed at a first position P1a relatively close to the pre-groove 221 or at a second position relatively distant from the pre-groove 221. Furthermore, the second wobble pit 213b is disposed at a first position P2a relatively close to the pre-groove 221 or at a second position P2b relatively distant from the pre-groove 221. Thus, the wobble pits 213 have four arrangement patterns: A pattern (P1a, P2b), B pattern (P1b, P2b), C pattern (P1b, P2a), and D pattern (P1a, P2a), depending upon the arrangement of the first wobble pit 213a and the second wobble pit 213b. These patterns can be identified by generating timing signals corresponding to P1a, P1b, P2a, and P2b from the synchronizing clock signal, and sampling reproduction signals using the timing signals.

Figure 12:
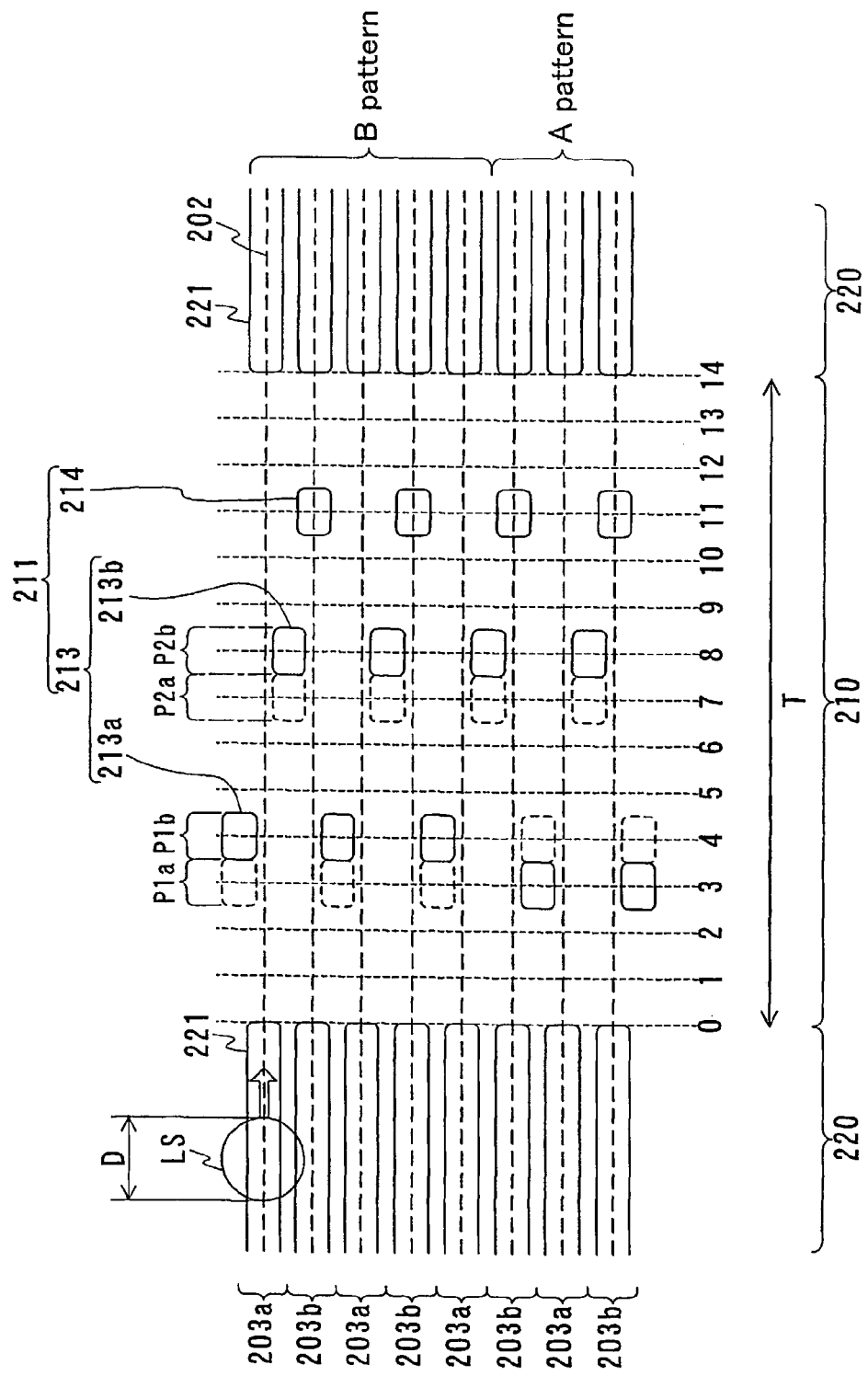
FIG. 12 is a diagram showing positions of wobble pits and clock pits in the information recording medium shown in FIGS. 10A, 10B, and 10C.

FIG. 12 schematically shows a relationship between the wobble pits 213 and the address pits 214, and the length of the prepit region 210. As shown in FIG. 12, in each pattern (A pattern, B pattern, C pattern, and D pattern), each wobble pit 213, and each address pit 214 are disposed so that each central position in a track direction is positioned on a partition obtained by partitioning the prepit region 210 into a plurality of regions with the same length. More specifically, the wobble pit 213 and the address pit 214 are disposed so that the distance between the center of a pit and the end of the prepit region 210 becomes an integral multiple of T/N (T is a length of the prepit region 210, and N is an integer of 5 or more). In an example shown in FIG. 12, the distance between the center of the wobble pit 213 and the address pit 214, and the end of the prepit region 210 is an integral multiple of T/14. More specifically, the distance between the center of the first wobble pit 213a and the end of the prepit region 210 is 3T/14 or 4T/14, and the distance between the center of the second wobble pit 213b and the end of the prepit region 210 is 7T/14 or 8T/14. Furthermore, the distance between the center of the address pit 214 and the end of the prepit region 210 is 11T/14. The arrangement shown in FIG. 12 is shown for illustrative purpose, and the present invention is not limited thereto.

In the case where the wobble pits 213 are arranged as shown in FIG. 12, and the length L of the wobble pit 213 satisfies $0.3 \leq L/D \leq 0.65$, a signal amplitude is convex downwardly, and has a minimum at the center of the wobble pit. Therefore, by comparing the position obtained by dividing the length of the prepit region 210 by an integer N (14 in Example 2) with a minimum position of a signal, it easily can be determined to which pattern a portion through which a light spot passes belongs.

In the information recording medium 20, A pattern, B pattern, C pattern, and D pattern are repeatedly arranged on the basis of 20 tracks from the inner peripheral side in the recording region 201. More specifically, A pattern (20 tracks), B pattern (20 tracks), C pattern (20 tracks), D pattern (20 tracks), A pattern (20 tracks), B pattern (20 tracks) . . . are repeated in this order from the inner peripheral side.

Thus, in the information recording medium 20, a pair of wobble pits 213 consist of a first wobble pit 213a having two types of arrangement, and a second wobble pit 213b having two types of arrangement. Furthermore, the prepit region 210 is divided into a plurality of zones arranged repeatedly in accordance with a distance from the center of the substrate 21. A plurality of zones have different combinations of the arrangement of the first wobble pits 213a and the arrangement of the second wobble pits 213b. In the information recording medium 20, because of such arrangement, the moving direction of a beam spot easily can be detected during recording/reproducing of information. For example, if it is found that a beam spot moves from A pattern to B pattern by detecting a signal from the wobble pit 213, it can be determined that the beam spot has moved from an inner peripheral side to an outer peripheral side.

Figure 13:
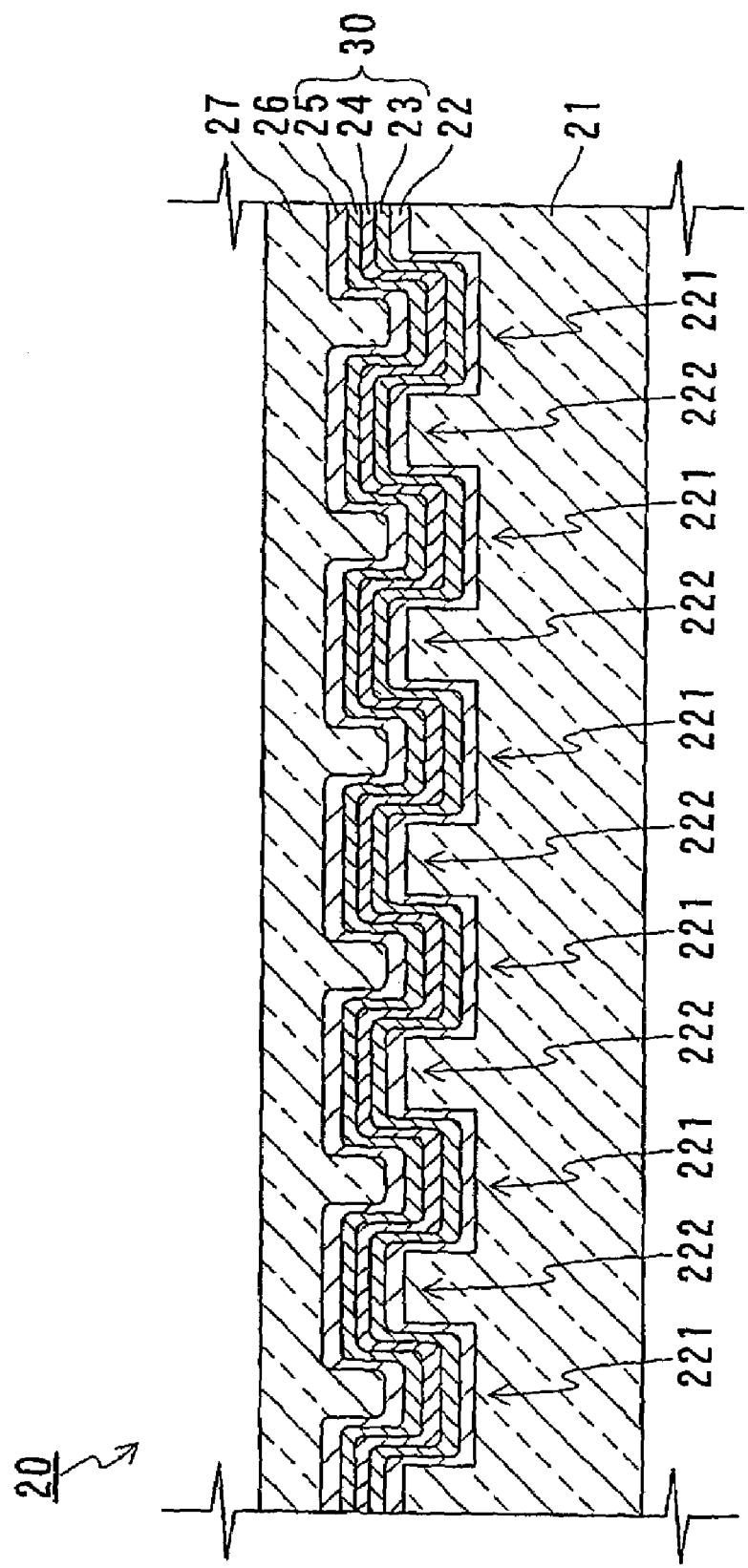
FIG. 13 is a cross-sectional view of the information recording medium shown in FIGS. 10A, 10B, and 10C.

Next, the data region 220 will be described. In the data region 220, a pre-groove 221 is formed along the virtual track center 202. FIG. 13 is a partially enlarged cross-sectional view of the data region 220 in the radius direction.

Referring to FIG. 13, the information recording medium 20 includes a substrate 21, and a dielectric layer 22, a reproduction layer (first magnetic layer) 23, an intermediate layer (second magnetic layer) 24, a magnetic recording layer (third magnetic layer) 25, a dielectric layer 26, and an overcoat layer 27 stacked on the substrate 21 in this order. The reproduction layer 23, the intermediate layer 24, and the magnetic recording layer 25 form the recording layer 30 of the information recording medium 20. More specifically, the recording layer of the information recording medium 20 includes a first magnetic layer, a second magnetic layer, and a third magnetic layer disposed in this order from a laser beam incident side. The Curie temperature of the first magnetic layer and that of the third magnetic layer are higher than that of the second magnetic layer.

The substrate 21 is made of the same material as that of the substrate 11. In the data region 220, pre-grooves 221 are formed on each virtual track center 202. The pre-grooves 221 are formed as linear concave portions on the substrate 21. Flat lands 222 are formed between adjacent pre-grooves 221.

The dielectric layer 22 may be made of SiN and have a thickness of 80 nm. The reproduction layer 23 may be made of GdFeCoCr and have a thickness of 30 nm. The intermediate layer 24 may be made of TdDyFe and have a thickness of 10 nm. The magnetic recording layer 25 may be made of TbFeCo and have a thickness of 50 nm. The dielectric layer 26 may be made of SiN and have a thickness of 80 nm. The reproduction layer 23 has a compensating composition temperature of 150° C. and a Curie temperature of 270° C. The intermediate layer 24 has a Curie temperature of 150° C., and a rare-earth metal composition always becomes predominant at a Curie temperature or lower. The magnetic recording layer 25 has a compensating composition temperature of 80° C. and a Curie temperature of 290° C. These layers can be formed by sputtering (e.g., DC magnetron sputtering, reactive sputtering, etc.). These layers can have a desired composition ratio by varying the sputtering conditions and targets.

The overcoat layer 27 may be made of epoxyacrylate resin and have a thickness of 6 $\mu$m. The overcoat layer 27 may be formed by coating the dielectric layer 26 with resin by spin coating, and irradiating the resin with UV-light to cure it.

In the information recording medium 20, adjacent tracks are cut off magnetically in the recording layer 30 of the data region 220. This is because a film to adhere to a side surface of a groove is very thin, and a side surface of a groove and a bottom surface of a groove are different from each other in magnetic characteristics. Thus, in the information recording medium 20, information can be reproduced by the DWDD method. Hereinafter, reproduction in accordance with the DWDD method will be described with reference to FIGS. 14A to 14D.

Figure 14A:
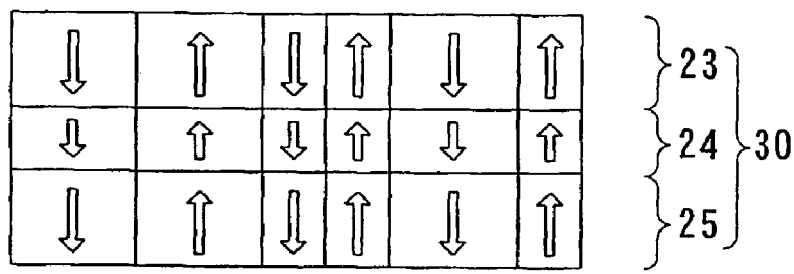
FIGS. 14A to 14D schematically show the function of the information recording medium shown in FIGS. 10A, 10B, and 10C.

FIG. 14A schematically shows a state of the data region 220 under the condition that a laser beam is not radiated. An information signal is recorded onto the magnetic recording layer 25 as magnetization information. When a laser beam is not radiated, the magnetic recording layer 25, the intermediate layer 24, and the reproduction layer 23 are exchange-coupled, so that magnetization information of the magnetic recording layer 25 is transferred to the intermediate layer 24 and the reproduction layer 23.

Figure 14B:
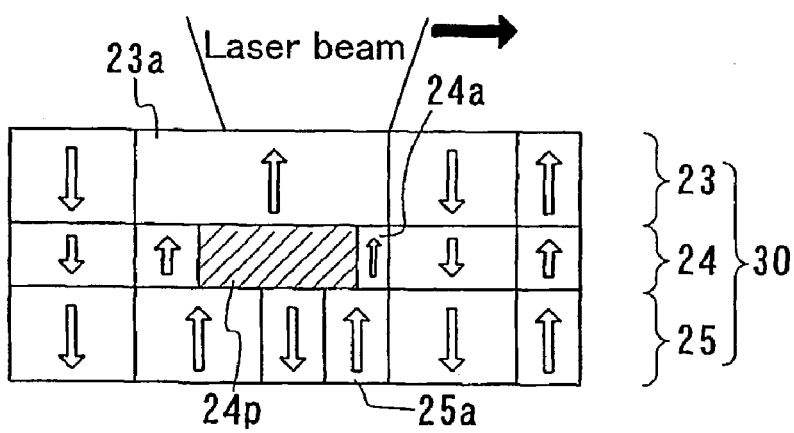

FIG. 14B schematically shows a state of the data region 220 when a laser beam is radiated. A laser beam moves relatively in the direction represented by an arrow with respect to the information recording medium 20. When a laser beam is radiated and the temperature of each layer is increased, a portion 24*p* (represented by a shaded area in the figure) is formed in a part of the intermediate layer 24, where the temperature reaches a Curie temperature or higher. In the portion 24*p*, exchange-coupling between the magnetic recording layer 25 and the reproduction layer 23 is shut off. At this time, a magnetic domain wall of the reproduction layer 23 moves due to the gradient of magnetic domain wall energy density dependent upon the temperature. Therefore, an enlarged magnetic domain 23*a* is present in the reproduction layer 23 positioned on the portion 24*p*. The information in the magnetic domain 25*a* of the magnetic recording layer 25 is transferred to the magnetic domain 23*a* via the magnetic domain 24*a* positioned forward of the portion 24*p* (a moving direction of a laser beam relative to the substrate 21 is assumed to be a forward direction, which is represented by an arrow in FIG. 14B).

Figure 14C:
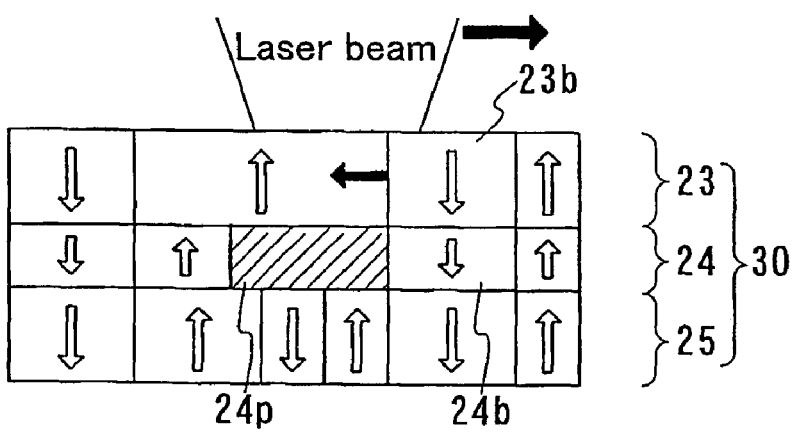
Figure 14D:
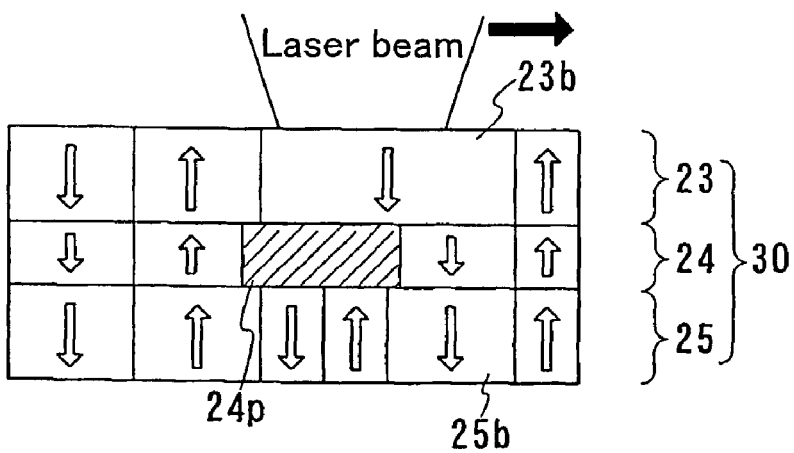

When a laser beam moves forward from the state in FIG. 14B, the temperature of the magnetic domain 24*a* is increased to become a portion 24*p*, as shown in FIG. 14C. At this time, a magnetic domain wall of the magnetic domain 23*b* on the magnetic domain 24*b* positioned forward of the portion 24*p* moves. As shown in FIG. 14D, an enlarged magnetic domain 23*b* is formed. The information of the magnetic domain 25*b* is transferred to the enlarged magnetic domain 23*b* via the intermediate layer 24.

As described above, according to the DWDD method, information recorded in a recording mark is enlarged and transferred to the reproduction layer. Thus, the DWDD method allows a recording mark smaller than a spot diameter of a laser beam to be reproduced. In the information recording medium 20, recording is conducted by optical pulse magnetic field modulation recording, and reproduction is conducted by the DWDD method, whereby information with a particularly high density can be recorded/reproduced.

The arrangement of patterns, and the number of tracks included in one pattern are not limited to the above, and another configuration may be used.

Figure 15:
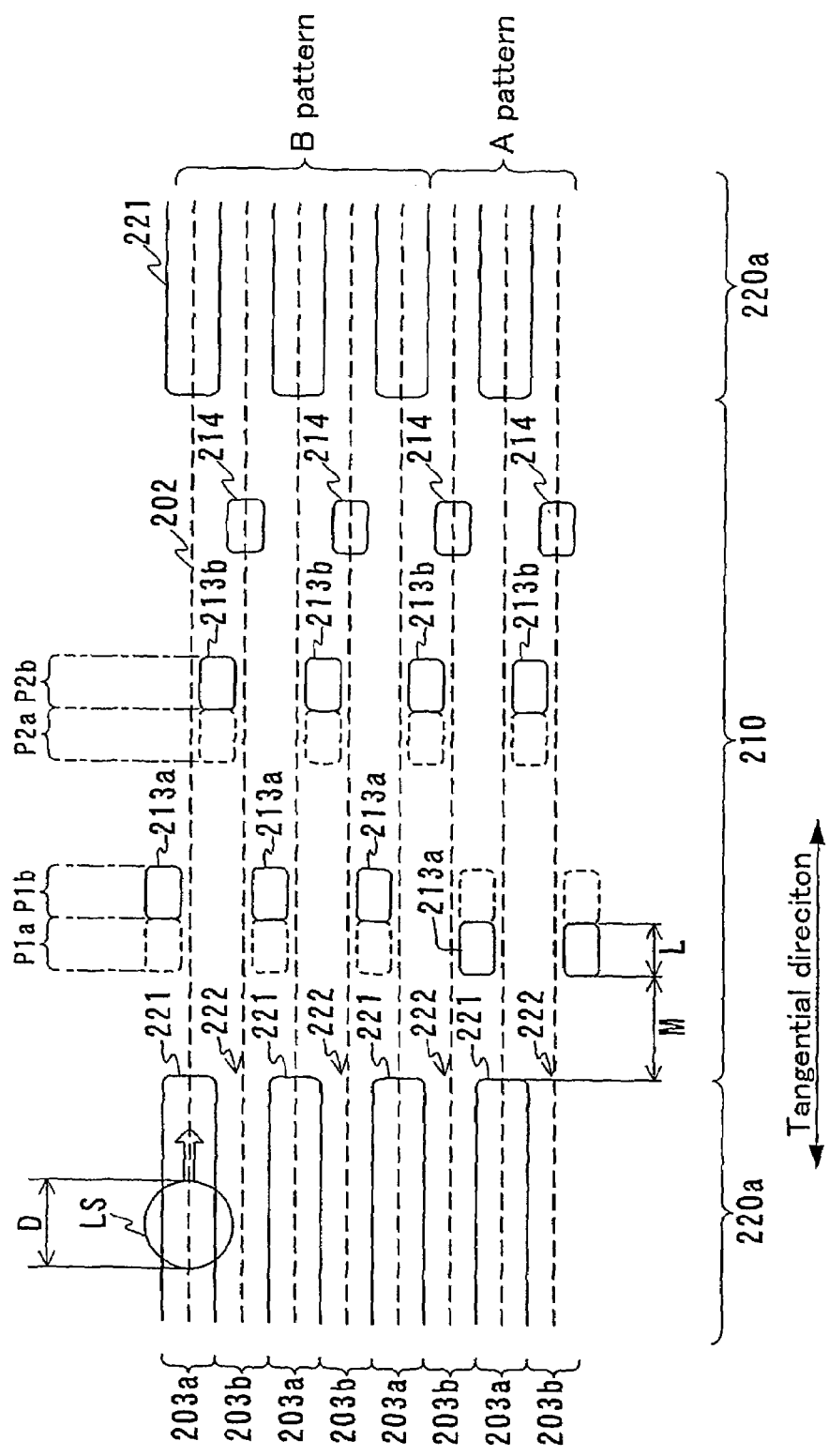
FIG. 15 schematically shows another exemplary configuration of segments in the information recording medium of the present invention.
Figure 17A:
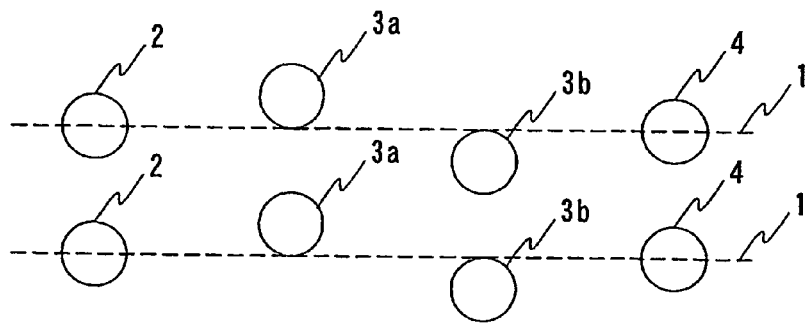
FIGS. 17A to 17D schematically show a relationship between the arrangement of prepits and reproduction signals in a conventional information recording medium.
Figure 17B:
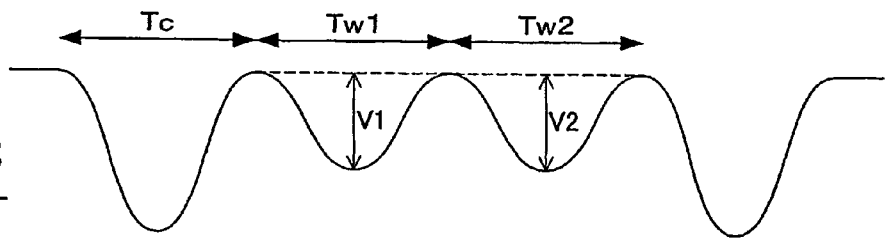
Figure 17C:
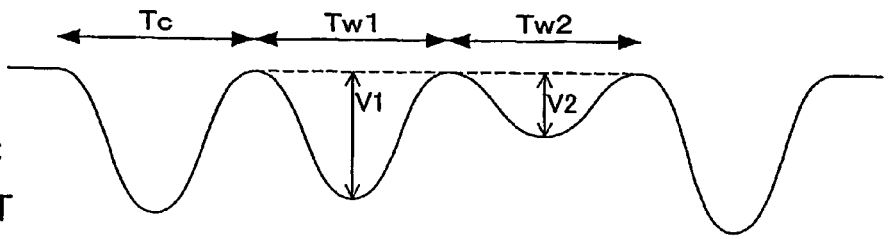
Figure 17D:
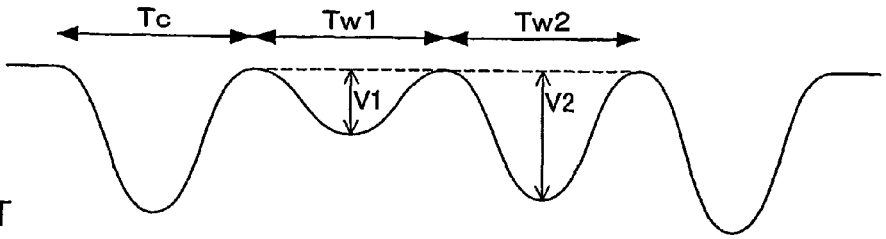
Figure 18A:
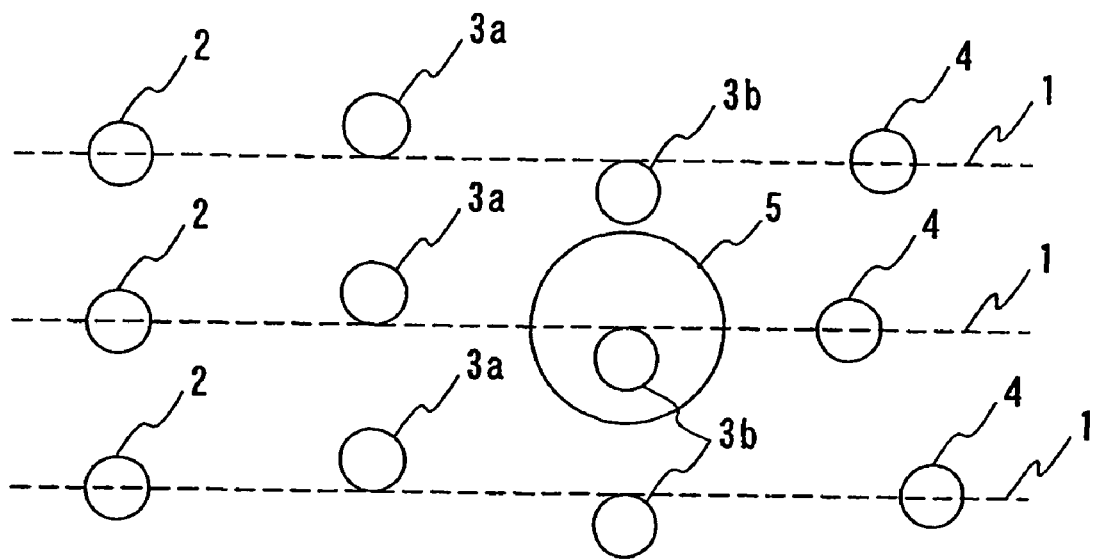
FIG. 18A schematically shows an example of a relationship between prepits and a laser beam spot in the conventional information recording medium, and FIG. 18B schematically shows another example thereof.
Figure 18B:
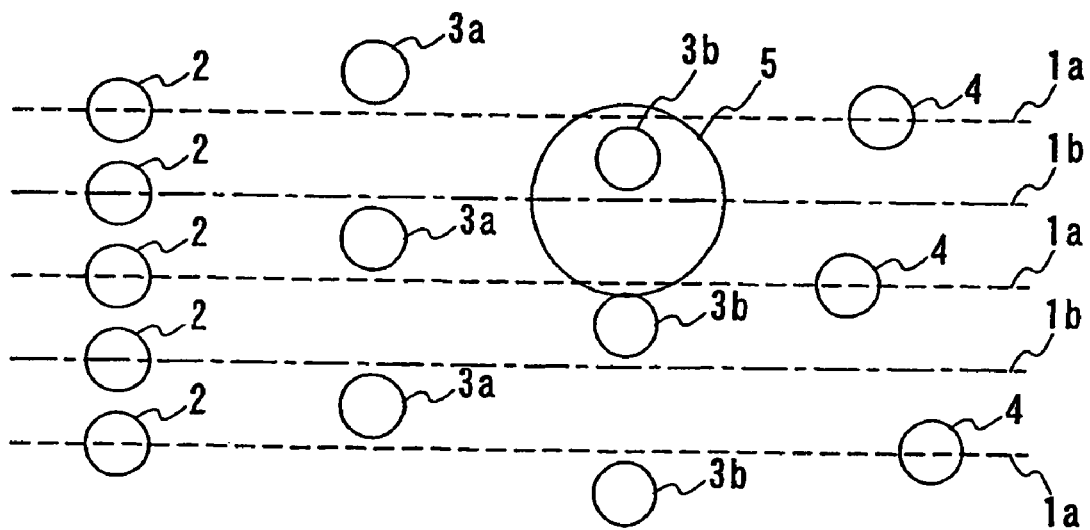
Figure 19:
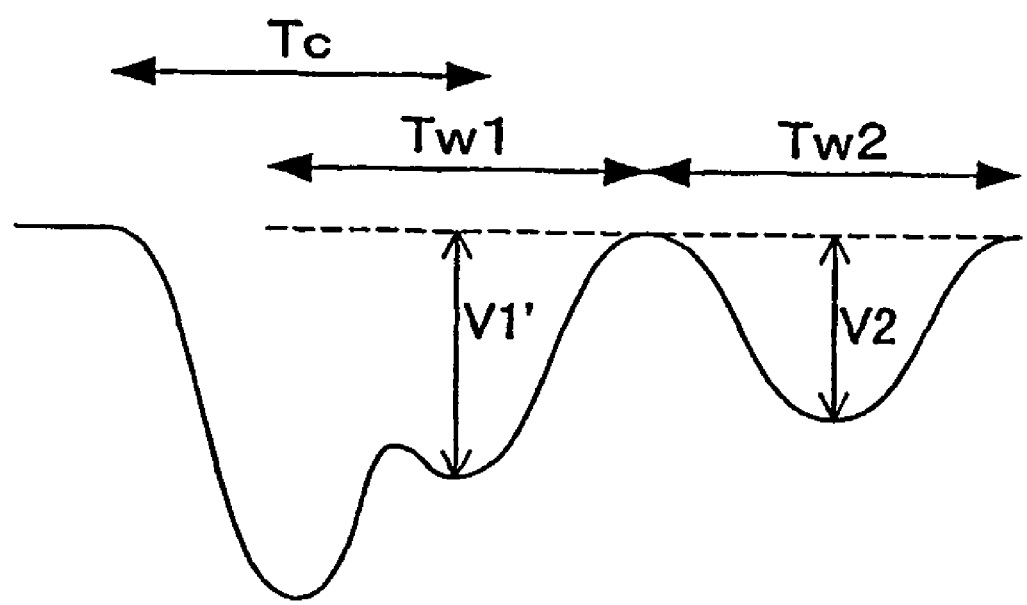
FIG. 19 shows an exemplary reproduction signal in the conventional information recording medium.
Figure 20A:
FIGS. 20A to 20C show other exemplary reproduction signals in the conventional information recording medium.
Figure 20B:
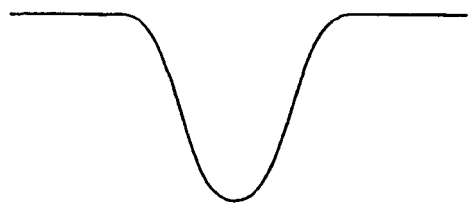
Figure 20C:

In Example 2, the information recording medium has been described in which the pre-grooves 221 are formed in each track in the data region 220. Another configuration may be used. For example, the pre-grooves 221 may be formed on every other tracks in the data region 220. Regarding such an information recording medium 20*a*, FIG. 15 schematically shows a configuration of the prepit region 210 and the data region 220*a*. The information recording medium 20*a* is different from the information recording medium 20 only in that the pre-grooves 221 are formed on every other track in the data region 220*a*. Therefore, the description will not be repeated here.

As shown in FIG. 15, in the data region 220*a*, the pre-grooves 221 are formed on every other track. Lands 222 also are formed on every other track. More specifically, data is recorded on the pre-grooves 221 in the track 203*a*, and data is recorded on the lands 222 in the track 203*b*. In the information recording medium 20*a*, adjacent tracks are cut off magnetically because of the difference in step between the pre-grooves 221 and the lands 222. Therefore, information can be reproduced in accordance with the DWDD method.

Example 3

In Example 3, an exemplary recording/reproducing apparatus used in the recording/reproducing method of the present invention will be described.

FIG. 16 schematically shows a configuration of a recording/reproducing apparatus 400 of Example 3. The recording/reproducing apparatus 400 records/reproduces information with respect to a recording medium 401 according to the present invention.

The recording/reproducing apparatus 400 may include a motor 402, an optical pickup 403, a differential and additional amplifier 404, a focus signal generating circuit 405, a PLL 406, a tracking control signal detection circuit 407, a control circuit 408, a laser driving circuit 409, a data decoder 410, a data encoder 411, a magnetic head driving circuit 412, and a magnetic head 413.

The motor 402 is controlled by the control circuit 408 and rotates the recording medium 401. The optical pickup 403 is controlled by the control circuit 408 and records/reproduces data with respect to the recording medium 401. The optical pickup 403 outputs signals regarding a P-polarized light component and an S-polarized light component to the differential and additional amplifier 404. The optical pickup 403 includes a semiconductor laser emitting a laser beam with a wavelength $\lambda$, and an objective lens with a numerical aperture NA. The differential and additional amplifier 404 conducts addition and differentiation of two signals input from the optical pickup 403, and outputs an addition signal (pit signal) and a differential signal (MO signal). The focus signal generating circuit 405 generates a signal for focus control. The PLL 406 extracts a clock pit from the addition signal input from the differential and additional amplifier 404, and generates a clock signal for recording/reproducing. The tracking control signal detection circuit 407 detects the amplitudes of a pair of wobble pits based on the input addition signal and clock signal, and generates a tracking control signal by calculating the difference between the two amplitudes. The control circuit 408 controls focusing, tracking, and the motor 402. The laser driving circuit 409 controls a laser power during recording and reproduction, and modulates a pulse of a laser. The data decoder 410 decodes reproduced data based on the input differential signal. The data encoder 411 encodes recorded data. The magnetic head driving circuit 412 drives the magnetic head 413 for recording of data. The magnetic head 413 generates a magnetic field in accordance with data for recording.

The recording/reproducing method of the present invention can be performed by using the recording/reproducing apparatus 400.

The present invention has been described by way of illustrative embodiments. However, the present invention is not limited to the above-mentioned embodiments, and is applicable to another embodiment based on the technical idea of the present invention.

In the above example, a magnetooptical disk adopting the sample servo tracking system is exemplified. However, an information recording medium of another system different from the sample servo tracking system may be used. For example, the present invention can be used in a disk of a tracking system provided with guide grooves and wobble pits, in which tracking usually is conducted using the guide grooves in accordance with the push-pull system, and a tracking control error is corrected using a wobble pit reproduction signal.

In Example 2, the case has been described in which wobble pits have two arrangements. However, the information recording medium of the present invention is not limited thereto, and wobble pits may have two or more arrangements.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

As described above, according to the present invention, an information recording medium can be obtained in which tracking control can be conducted with reliability and high-density recording of information can be conducted.

Furthermore, according to the recording/reproducing method of the present invention, information can be recorded onto an information recording medium with high density, and the information recorded with high density can be reproduced from the information recording medium.

What is claimed is:

1. An information recording medium for reproducing information by irradiation with a laser beam condensed by an objective lens with a numerical aperture NA, comprising a disk-shaped substrate and a recording layer disposed on the substrate, wherein, on a surface of the substrate, a plurality of prepit regions and a plurality of data regions are disposed alternately along spiral or concentric virtual track centers, each prepit region includes a pair of wobble pits for tracking servo, flat portions are present on a surface of the substrate before and after the wobble pits along the virtual track center, and a length M ($\mu$m) of the flat portion along the virtual track center, a wavelength $\lambda$ ($\mu$m) of the laser beam and the NA satisfy a relationship: $0.65 \leq M \cdot NA/\lambda$.

2. An information recording medium according to claim 1, wherein one of the pair of wobble pits is shared by two prepit regions that are adjacent in a radius direction of the substrate.

3. An information recording medium according to claim 1, wherein the prepit region is divided into a plurality of zones that are arranged repeatedly in accordance with a distance from a center of the substrate, the pair of wobble pits are composed of a first wobble pit that has two possible arrangements and a second wobble pit that has two possible arrangements, and the plurality of zones have different combinations of the arrangement of the first wobble pit and the arrangement of the second wobble pit.

4. An information recording medium according to claim 1, wherein grooves are formed in portions corresponding to the data regions in the substrate.

5. An information recording medium according to claim 4, wherein the recording layer includes a first magnetic layer, a second magnetic layer, and a third magnetic layer disposed in this order from an incident side of the laser beam, a Curie temperature of the first magnetic layer and a Curie temperature of the third magnetic layer are higher than a Curie temperature of the second magnetic layer, and the recording layer is cut off magnetically between adjacent tracks.

6. An information recording medium according to claim 1, wherein lengths of the prepit regions along the virtual track center are constant.

7. An information recording medium according to claim 6, wherein a distance between each center of the pair of wobble pits and an end of the prepit region is represented by an integral multiple of T/N, where T is a length of the prepit region along the virtual track center and N is an integer of 5 or more.

8. A recording/reproducing method for recording/reproducing information by irradiating an information recording medium with a laser beam condensed by an objective lens with a numerical aperture NA, wherein the information recording medium includes a disk-shaped substrate and a recording layer disposed on the substrate, a plurality of prepit regions and a plurality of data regions are disposed alternately along spiral or concentric virtual track centers on a surface of the substrate, each prepit region includes a pair of wobble pits for tracking servo, flat portions are present on the surface of the substrate before and after the wobble pits along the virtual track center, and a length M ($\mu$m) of the flat portion along the virtual track center, a wavelength $\lambda$ ($\mu$m) of the laser beam, and the NA satisfy a relationship: $0.65 \leq M \cdot NA/\lambda$.

9. An information recording medium according to claim 1, wherein a length L ($\mu$m) of the wobble pit along the virtual track center, a wavelength $\lambda$ ($\mu$m) of the laser beam, and the NA satisfy a relationship: $0.3 \leq L \cdot NA/\lambda \leq 0.65$.

10. A recording/reproducing method according to claim 8, wherein a length L ($\mu$m) of the wobble pit along the virtual track center, a wavelength $\lambda$ ($\mu$m) of the laser beam, and the NA satisfy a relationship: $0.3 L \cdot NM/\lambda \leq 0.65$.

* * * * *

UNITED STATES PATENT AND TRADEMARK OFFICE
CERTIFICATE OF CORRECTION

| | | |
|---|---|---|
| PATENT NO. | : 6,965,545 B2 | Page 1 of 1 |
| APPLICATION NO. | : 10/110613 | |
| DATED | : November 15, 2005 | |
| INVENTOR(S) | : Hine et al. | |

It is certified that error appears in the above-identified patent and that said Letters Patent is hereby corrected as shown below:

Col. 22, line 11: "0.3L•NM" should read --0.3<L•NA--

Signed and Sealed this

Fifteenth Day of August, 2006

JON W. DUDAS
*Director of the United States Patent and Trademark Office*